US012676401B2

(12) United States Patent
Cho et al.

(10) Patent No.: US 12,676,401 B2
(45) Date of Patent: Jul. 7, 2026

(54) ELECTRONIC DEVICE INCLUDING ANTENNA MODULE

(71) Applicant: Samsung Electronics Co., Ltd., Suwon-si (KR)

(72) Inventors: Sujin Cho, Suwon-si (KR); Woosung Chun, Suwon-si (KR); Jongpil Lee, Suwon-si (KR); Jungchul An, Suwon-si (KR); Soyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 294 days.

(21) Appl. No.: 18/363,273

(22) Filed: Aug. 1, 2023

(65) Prior Publication Data

US 2024/0047858 A1      Feb. 8, 2024

Related U.S. Application Data

(63) Continuation of application No. PCT/KR2023/011217, filed on Aug. 1, 2023.

(30) Foreign Application Priority Data

| | | |
|---|---|---|
| Aug. 5, 2022 | (KR) | 10-2022-0097935 |
| Aug. 9, 2022 | (KR) | 10-2022-0099263 |
| Jul. 31, 2023 | (KR) | 10-2023-0099747 |

(51) Int. Cl.
*H01Q 1/24* (2006.01)
*H01Q 1/36* (2006.01)
*H04M 1/02* (2006.01)

(52) U.S. Cl.
CPC .............. *H01Q 1/243* (2013.01); *H01Q 1/36* (2013.01); *H04M 1/0214* (2013.01)

(58) Field of Classification Search
CPC ............ H01Q 1/24; H01Q 1/243; H01Q 1/36; H01Q 1/42; H01Q 21/0025;
(Continued)

(56) References Cited

U.S. PATENT DOCUMENTS

| | | |
|---|---|---|
| 10,444,426 B2 | 10/2019 | Yamaguchi et al. |
| 10,736,211 B2 | 8/2020 | Park et al. |

(Continued)

FOREIGN PATENT DOCUMENTS

| | | |
|---|---|---|
| KR | 10-2020-0021172 A | 2/2020 |
| KR | 10-2021-0100443 A | 8/2021 |

(Continued)

OTHER PUBLICATIONS

International Search Report dated Nov. 20, 2023, issued in International Patent Application No. PCT/KR2023/011217.
(Continued)

*Primary Examiner* — Thai Pham
(74) *Attorney, Agent, or Firm* — Jefferson IP Law, LLP

(57) ABSTRACT

An electronic device is provided. The electronic device includes a first housing including a first plate, a second housing including a second plate, a display disposed on the first plate of the first housing and the second plate of the second housing, a hinge member that is disposed between the first housing and the second housing and that rotatably connects the first housing and the second housing, and an antenna module disposed in the first housing. The first plate includes an antenna seating portion on which the antenna module is seated. The antenna seating portion is formed between a first sidewall part and a second sidewall part that vertically extend from one surface of the first plate and face each other. The antenna module is disposed such that at least a portion faces the first sidewall part and the second sidewall part. The first sidewall part includes a bumpy structure.

19 Claims, 20 Drawing Sheets

(58) Field of Classification Search
CPC .. H01Q 21/0625; H04M 1/02; H04M 1/0206; H04M 1/0214; H04M 1/022; H04M 1/026; H04M 1/0268

See application file for complete search history.

(56) References Cited

U.S. PATENT DOCUMENTS

| | | | |
|---|---|---|---|
| 10,992,028 | B2 | 4/2021 | Moon et al. |
| 11,380,980 | B2 | 7/2022 | Moon et al. |
| 11,527,814 | B2 | 12/2022 | Han et al. |
| 11,528,349 | B2 | 12/2022 | Kim et al. |
| 11,588,220 | B2 | 2/2023 | Lee et al. |
| 11,885,761 | B2 * | 1/2024 | An ..................... H10K 50/844 |
| 11,930,127 | B2 | 3/2024 | Kim et al. |
| 11,984,661 | B2 | 5/2024 | Jiang et al. |
| 12,273,474 | B2 | 4/2025 | Kim et al. |
| 12,316,796 | B2 | 5/2025 | Heo et al. |
| 2017/0068035 | A1 | 3/2017 | Yamaguchi et al. |
| 2020/0060020 | A1 | 2/2020 | Park et al. |
| 2020/0162596 | A1 | 5/2020 | Kim et al. |
| 2021/0242572 | A1 | 8/2021 | Moon et al. |
| 2021/0249751 | A1 | 8/2021 | Lee et al. |
| 2021/0376453 | A1 | 12/2021 | Han et al. |
| 2022/0094053 | A1 | 3/2022 | Jiang et al. |
| 2022/0345559 | A1 * | 10/2022 | Heo ..................... H04M 1/0277 |
| 2022/0346256 | A1 * | 10/2022 | Kim ..................... G06F 1/1681 |
| 2023/0269315 | A1 | 8/2023 | Lee et al. |
| 2023/0269893 | A1 * | 8/2023 | Yun ..................... G06F 1/1681 |
| 2025/0286943 | A1 | 9/2025 | Heo et al. |

FOREIGN PATENT DOCUMENTS

| | | |
|---|---|---|
| KR | 10-2021-0147712 A | 12/2021 |
| KR | 10-2021-0157226 A | 12/2021 |
| KR | 10-2022-0021733 A | 2/2022 |
| KR | 10-2022-0029158 A | 3/2022 |
| KR | 10-2022-0039532 A | 3/2022 |
| KR | 10-2022-0058225 A | 5/2022 |
| WO | 2022/035283 A1 | 2/2022 |
| WO | WO-2022119101 A1 * | 6/2022 .......... H04M 1/0216 |

OTHER PUBLICATIONS

Extended European Search Report dated Jul. 9, 2025, issued in a European Patent Application No. 23850388.2.

* cited by examiner

189 { 189a, 189b
      189c, 189d

ELECTRONIC DEVICE INCLUDING ANTENNA MODULE

CROSS-REFERENCE TO RELATED APPLICATION(S)

This application is a continuation application, claiming priority under § 365(c), of an International application No. PCT/KR2023/011217, filed on Aug. 1, 2023, which is based on and claims the benefit of a Korean patent application number filed on Aug. 5, 2022, in the Korean Intellectual Property Office, of a Korean patent application number 10-2022-0099263, filed on Aug. 9, 2022, in the Korean Intellectual Property Office, and of a Korean patent application number 10-2023-0099747, filed on Jul. 31, 2023, in the Korean Intellectual Property Office, the disclosure of each of which is incorporated by reference herein in its entirety.

TECHNICAL FIELD

The disclosure relates to a foldable electronic device including an antenna module.

BACKGROUND ART

Due to the rapid increase in mobile traffic, a high-bandwidth frequency-based $5^{th}$ generation (5G) technology is being developed. A high-band frequency signal may include a millimeter wave (mmWave) having a frequency band of 20 gigahertz (GHz) to 300 GHz.

A housing structure of a foldable electronic device may include a first housing and a second housing connected by a hinge structure. The foldable electronic device may be folded and/or unfolded by rotation of the first housing and the second housing about the hinge structure. The foldable electronic device may include one or more high-frequency antenna modules (e.g., mmWave antenna modules) for 5G communication.

The above information is presented as background information only to assist with an understanding of the disclosure. No determination has been made, and no assertion is made, as to whether any of the above might be applicable as prior art with regard to the disclosure.

DISCLOSURE

Aspects of the disclosure are to address at least the above-mentioned problems and/or disadvantages and to provide at least the advantages described below. Accordingly, an aspect of the disclosure is to provide a foldable electronic device including an antenna module.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first housing including a first plate, a second housing including a second plate, a display disposed on the first plate of the first housing and the second plate of the second housing, a hinge member that is disposed between the first housing and the second housing and configured to rotatably connect the first housing and the second housing, and an antenna module disposed in the first housing. The first plate includes an antenna seating portion on which the antenna module is seated. The antenna seating portion is formed between a first sidewall part and a second sidewall part that vertically extend from one surface of the first plate and face each other. The antenna module is disposed such that at least a portion faces the first sidewall part and the second sidewall part. The first sidewall part includes a bumpy structure.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
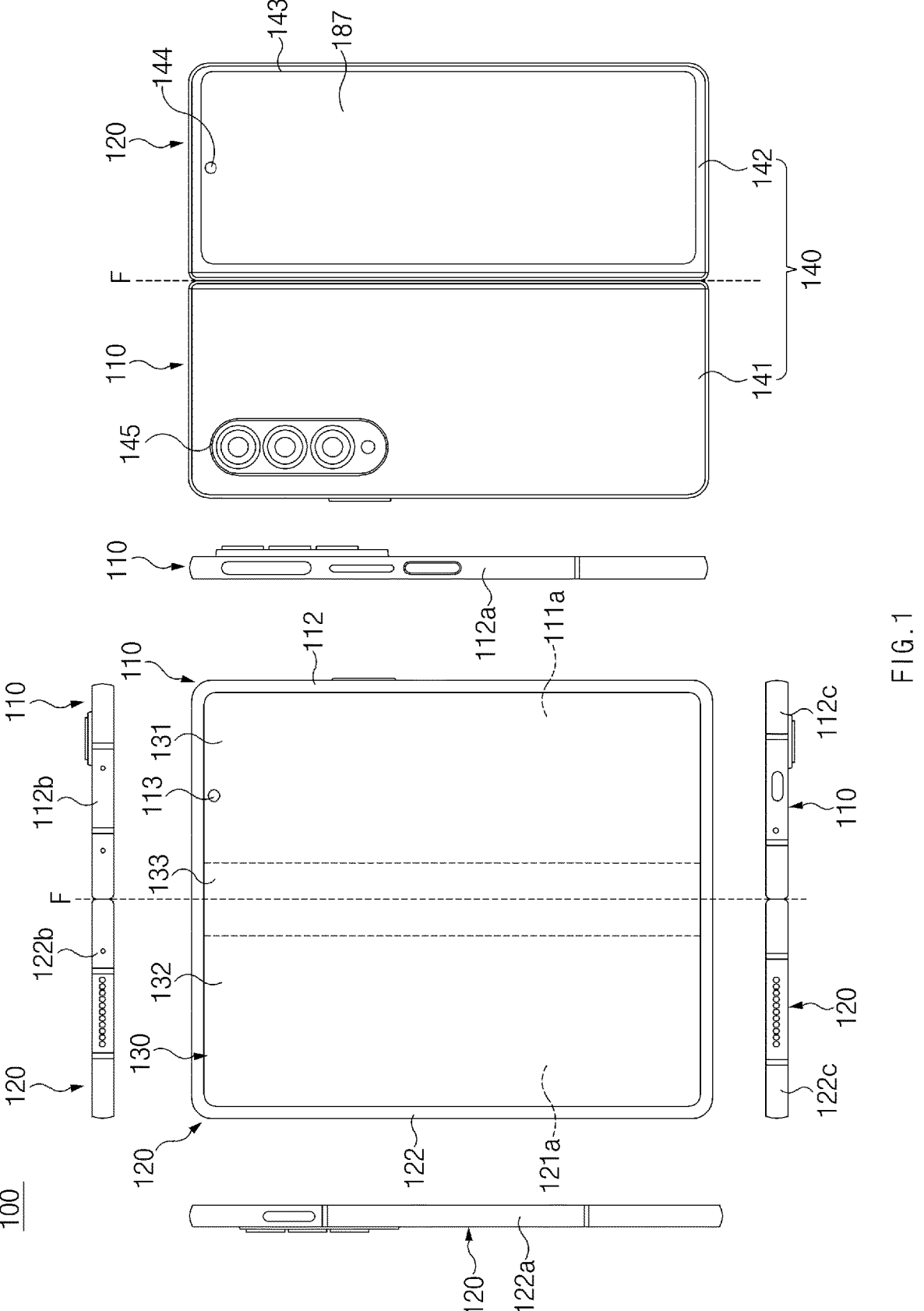
FIG. 1 is a view illustrating an unfolded state of an electronic device according to an embodiment of the disclosure.
Figure 2:
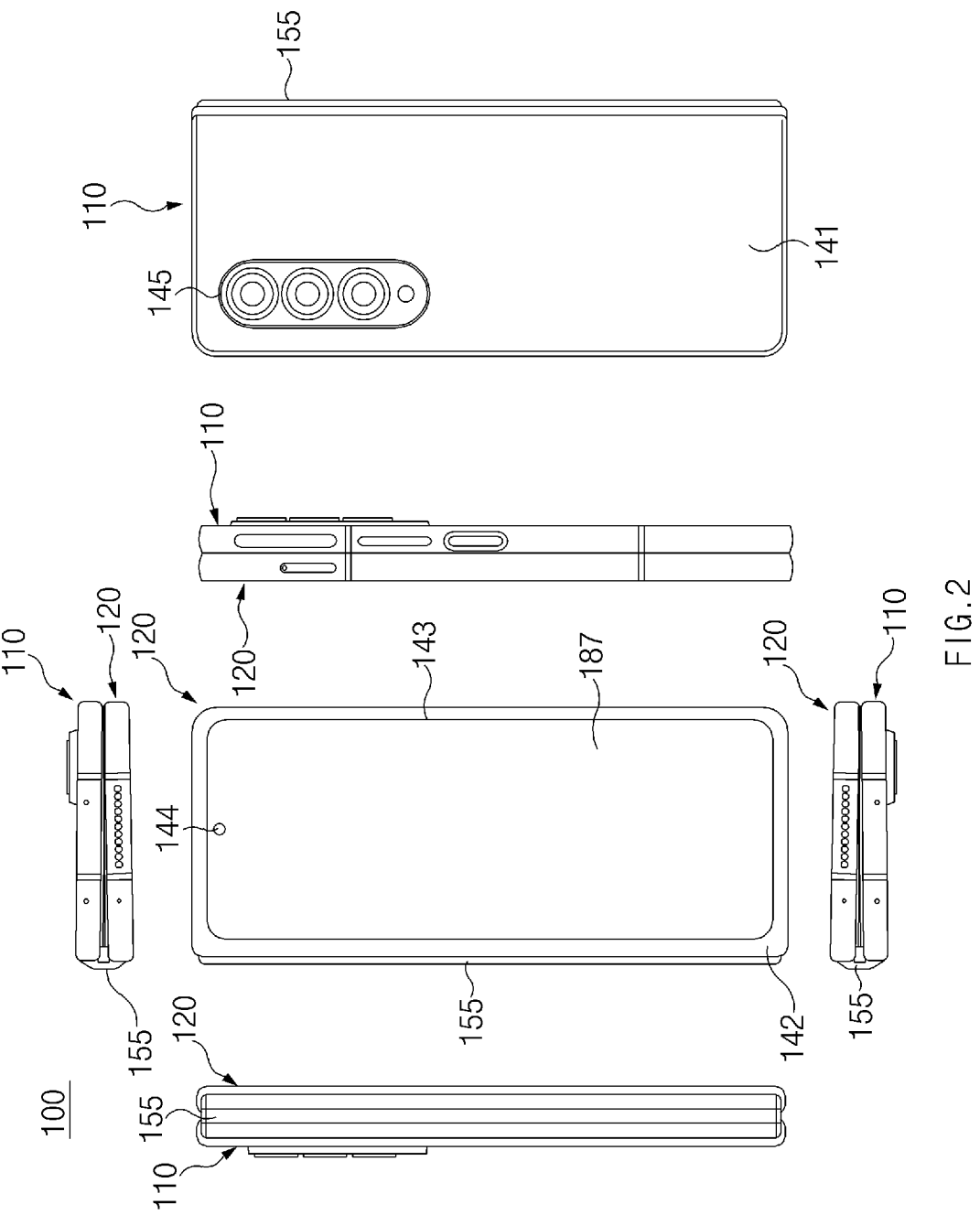
FIG. 2 is a view illustrating a folded state of an electronic device according to an embodiment of the disclosure.

FIG. 1 is a view illustrating an unfolded state of an electronic device according to an embodiment of the disclosure. FIG. 2 is a view illustrating a folded state of the electronic device according to an embodiment of the disclosure.

Referring to FIGS. 1 and 2, the electronic device according to an embodiment may include housing structures 110 and 120, a display 130 (or a flexible display), a back cover 140, and a hinge cover 155.

An electronic device 100 may be a foldable electronic device that is deformable to an unfolded state (e.g., the state of FIG. 1) and a folded state (e.g., the state of FIG. 2). For example, the electronic device 100 may include the pair of housing structures 110 and 120 coupled with each other so as to be rotatable relative to each other, the hinge cover 155 that covers foldable portions of the housing structures 110 and 120, and the display 130 disposed in a space formed by the housing structures 110 and 120.

In an embodiment of the disclosure, a surface formed or defined by the display 130 based on the unfolded state of the electronic device 100 may be defined as a front surface of the electronic device 100, and a surface facing away from the front surface may be defined as a rear surface of the electronic device 100. In addition, a surface surrounding a space between the front surface and the rear surface may be defined as a side surface of the electronic device 100.

The housing structures 110 and 120 may include the first housing 110 and the second housing 120. The first housing 110 and the first housing 120 may be folded or unfolded about a virtual folding axis F relative to each other. The first housing 110 and the second housing 120 may be connected by hinge structures (e.g., hinge structures 151 of FIG. 3) so as to be rotatable relative to each other and may be folded or unfolded by rotating about rotational axes thereof. For example, the rotational axes of the first housing 110 and the second housing 120 may be formed by the hinge structures 151.

The first housing 110 and the second housing 120 may be disposed on opposite sides with respect to the folding axis F and may have substantially symmetrical shapes with respect to the folding axis F. The angle or distance between the first housing 110 and the second housing 120 may vary depending on whether the electronic device 100 is in an unfolded state (or, an opened state), a folded state (or, a closed state), or an intermediate state. According to various embodiments of the disclosure, the first housing 110 and the second housing 120 may have asymmetric shapes with respect to the folding axis F. For example, when the electronic device 100 is in a folded state, the first housing 110 and the second housing 120 may have different sizes or may be folded in an asymmetric form about the folding axis F such that a portion of a display 130 is exposed outside the electronic device 100.

The first housing 110 may include a first camera region 113. For example, the first camera area 113 for a function of a camera may be formed or provided in the first housing 110. The first camera region 113 may be located on a partial region of the display 130 or may overlap a partial region of the display 130. According to various embodiments of the disclosure, a first camera region 113 may be disposed in the second housing 120, in addition to or instead of the first camera region 113 of the first housing 110. A camera (not illustrated) may be visually exposed through the first camera region 113. For example, the camera exposed through the first camera region 113 may include a punch hole camera disposed in a hole or recess formed in the display 130. According to various embodiments of the disclosure, the camera may be disposed under the display 130 (e.g., an under display camera (UDC)) so as not to be exposed outside the electronic device 100.

The first housing 110 may include a first surface 111a on which a partial region (e.g., a first region 131) of the display 130 is disposed, a second surface 111b that faces away from the first surface 111a and on which a first back cover 141 is disposed, and a first side member 112 surrounding the peripheries of the first surface 111a and the second surface 111b. The first side member 112 may include a first side surface 112a extending substantially parallel to the folding axis F, a second side surface 112b extending from one end of the first side surface 112a in a direction substantially perpendicular to the folding axis F, and a third side surface 112c extending from an opposite end of the first side surface 112a in the direction substantially perpendicular to the folding axis F.

The second housing 120 may include a third surface 121a on which a partial region (e.g., a second region 132) of the display 130 is disposed, a fourth surface 121b that faces away from the third surface 121a and on which a second back cover 142 is disposed, and a second side member 122 surrounding the peripheries of the third surface 121a and the fourth surface 121b. The second side member 122 may include a fourth side surface 121a extending substantially parallel to the folding axis F, a fifth side surface 121b extending from one end of the fourth side surface 121*a* in a direction substantially perpendicular to the folding axis F, and a sixth side surface 121*c* extending from an opposite end of the fourth side surface 121*a* in the direction substantially perpendicular to the folding axis F.

The first housing 110 and the second housing 120 may be at least partially formed of a metallic material or a non-metallic material. At least a portion of the first housing 110 and at least a portion of the second housing 120 may be formed of a metallic or non-metallic material having a specified rigidity to support the display 130.

The display 130 may be disposed in the space formed by the first housing 110 and the second housing 120. For example, the display 130 may be disposed in a display receiving portion formed by the first surface 111*a* and the first side member 112 of the first housing 110 and the third surface 121*a* and the second side member 122 of the second housing 120. The display receiving portion may have substantially the same shape or size as the display 130. The display receiving portion may be formed over the first surface 111*a* of the first housing 110 and the third surface 121*a* of the second housing 120. For example, the display 130 may be seated on the first surface 111*a* of the first housing 110 and the third surface 121*a* of the second housing 120. The display 130 may be configured to substantially form or define most of the front surface of the electronic device 100.

The display 130 may be deformed such that a partial region (e.g., a folding region 133) substantially forms a flat surface or a curved surface in response to a folding or unfolding operation of the electronic device 100. For example, the display 130 may be a flexible display. The display 130 may include the folding region 133 deformed as the state of the electronic device 100 is changed, the first region 131 extending from one side (e.g., the right side based on FIG. 1) of the folding region 133, and the second region 132 extending from an opposite side (e.g., the left side based on FIG. 1) of the folding region 133. The shapes of the first region 131 and the second region 132 may be maintained without being deformed irrespective of a folding or unfolding operation of the electronic device 100. For example, the first region 131 and the second region 132 may remain substantially flat.

The first region 131, the second region 132, and the folding region 133 of the display 130 may be divided from one another based on whether the shape is deformed when a folding operation of the display 130 is performed, and it does not mean that the regions are physically divided or separated from one another or have different characteristics.

The back cover 140 may form the exterior of the electronic device 100 together with the housing structures 110 and 120. For example, the back cover 140 may form the rear surface of the electronic device 100 when the electronic device 100 is in an unfolded state. The back cover 140 may include the first back cover 141 and the second back cover 142.

The first back cover 141 may be coupled to the first housing 110. For example, the first back cover 141 may be disposed on the second surface 111*b* of the first housing 110. The first back cover 141 may have a substantially rectangular periphery, and at least a portion of the periphery may be surrounded by the first side member 112 of the first housing 110. The first housing 110 and the first back cover 141 may be coupled with each other to provide a space in which various parts (e.g., a printed circuit board, an antenna module, a sensor module, or a battery) of the electronic device 100 are disposed.

The second back cover 142 may be coupled to the second housing 120. For example, the second back cover 142 may be disposed on the fourth surface 121*b* of the second housing 120. The second back cover 142 may have a substantially rectangular periphery, and at least a portion of the periphery may be surrounded by the second side member 122 of the second housing 120. The second housing 120 and the second back cover 142 may be coupled with each other to provide a space in which various parts (e.g., a printed circuit board, an antenna module, a sensor module, or a battery) of the electronic device 100 are disposed.

A region where one or more parts are disposed or visually exposed may be formed on the first back cover 141 and the second back cover 142. A second camera region 145 where a camera is disposed or exposed may be formed on the first back cover 141. A cover display region 143 where a cover display 187 disposed on the rear surface of the second back cover 142 (e.g., between the fourth surface 121*b* of the second housing 120 and the second back cover 142) is visually exposed may be formed on the second back cover 142. For example, the cover display region 143 of the second back cover 142 may be formed to be transparent such that at least a portion of the cover display 187 is visible. A third camera region 144 where a camera is disposed or exposed may be formed on the second back cover 142. For example, the camera exposed through the third camera region 144 may include a punch hole camera disposed in a hole or recess formed in the cover display 187.

The hinge cover 155 may be disposed between the first housing 110 and the second housing 120 and may cover the hinge structures (e.g., the hinge structures 151 of FIGS. 3 and 4) such that the hinge structures are not exposed to the outside.

The hinge cover 155 may be hidden by the first housing 110 and the second housing 120, or may be partially exposed outside the housing structures 110 and 120, depending on an operational state (an unfolded state or a folded state) of the electronic device 100. For example, when the electronic device 100 is in an unfolded state, the hinge cover 155 may be hidden by the first housing 110 and the second housing 120 and may not be exposed on the exterior of the electronic device 100. Furthermore, when the electronic device 100 is in a folded state (e.g., a completely folded state), the hinge cover 155 may be exposed outside the electronic device 100 from between the first housing 110 and the second housing 120. In addition, when the electronic device 100 is in an intermediate folded state in which the first housing 110 and the second housing 120 are folded with a certain angle, the hinge cover 155 may be partially exposed outside the electronic device 100 from between the first housing 110 and the second housing 120. The region where the hinge cover 155 is exposed outside the electronic device 100 in the intermediate folded state may be smaller than the region where the hinge cover 155 is exposed in the completely folded state. The hinge cover 155 may at least partially include a curved surface.

Hereinafter, operations of the first housing 110 and the second housing 120 and states of the regions of the display 130 depending on states (e.g., an unfolded state and a folded state) of the electronic device 100 will be described.

When the electronic device 100 is in an unfolded state (e.g., FIG. 1), the first housing 110 and the second housing 120 may form the same plane while substantially forming an angle of 180 degrees. The first region 131 and the second region 132 of the display 130 may be disposed to face the same direction. The folding region 133 of the display 130 may form substantially the same plane as the first region 131 and the second region 132. In the unfolded state, the first region 131, the second region 132, and the folding region 133 may provide a screen display region while forming the front surface of the electronic device 100. According to various embodiments of the disclosure, in the unfolded state, the folding region 133 may be formed to be a curved surface having a curvature of a predetermined magnitude or less, but may have a substantially flat shape.

When the electronic device 100 is in a folded state (a completely folded state) (e.g., FIG. 2), the first housing 110 and the second housing 120 may be disposed to face each other. The first region 131 and the second region 132 of the display 130 may face each other while forming a narrow angle (e.g., between 0 degrees and 10 degrees). At least a portion of the folding region 133 may be formed to be a curved surface having a curvature of a specified magnitude or more.

When the electronic device 100 is in an intermediate state (e.g., an intermediate folded state) between an unfolded state and a folded state, the first housing 110 and the second housing 120 may be disposed at a certain angle. The intermediate state may mean states in a process in which the electronic device 100 is changed between the unfolded state and the folded state. For example, the intermediate state may mean a state before the first housing 110 and the second housing 120 are completely unfolded or folded. The angle between the first region 131 and the second region 132 of the display 130 in the intermediate state may be greater than the angle in the folded state and may be smaller than the angle in the unfolded state. At least a portion of the folding region 133 may be formed to be a curved surface having a predetermined curvature, and the curvature may be smaller than the curvature in the folded state and may be greater than the curvature in the unfolded state.

The electronic device 100 according to the embodiment illustrated in FIGS. 1 and 2 may be an in-folding type electronic device in which the display 130 is folded inward such that the display 130 is not exposed outside the electronic device 100 in the folded state. However, the electronic device according to an embodiment of the disclosure is not limited to the illustrated embodiment. According to various embodiments of the disclosure, the electronic device may be an out-folding type electronic device in which the display 130 is folded outward such that the display 130 is visually exposed outside the electronic device in the folded state. Furthermore, according to various embodiments of the disclosure, the electronic device may be a multi-folding type electronic device in which in-folding and out-folding are combined.

Figure 3:
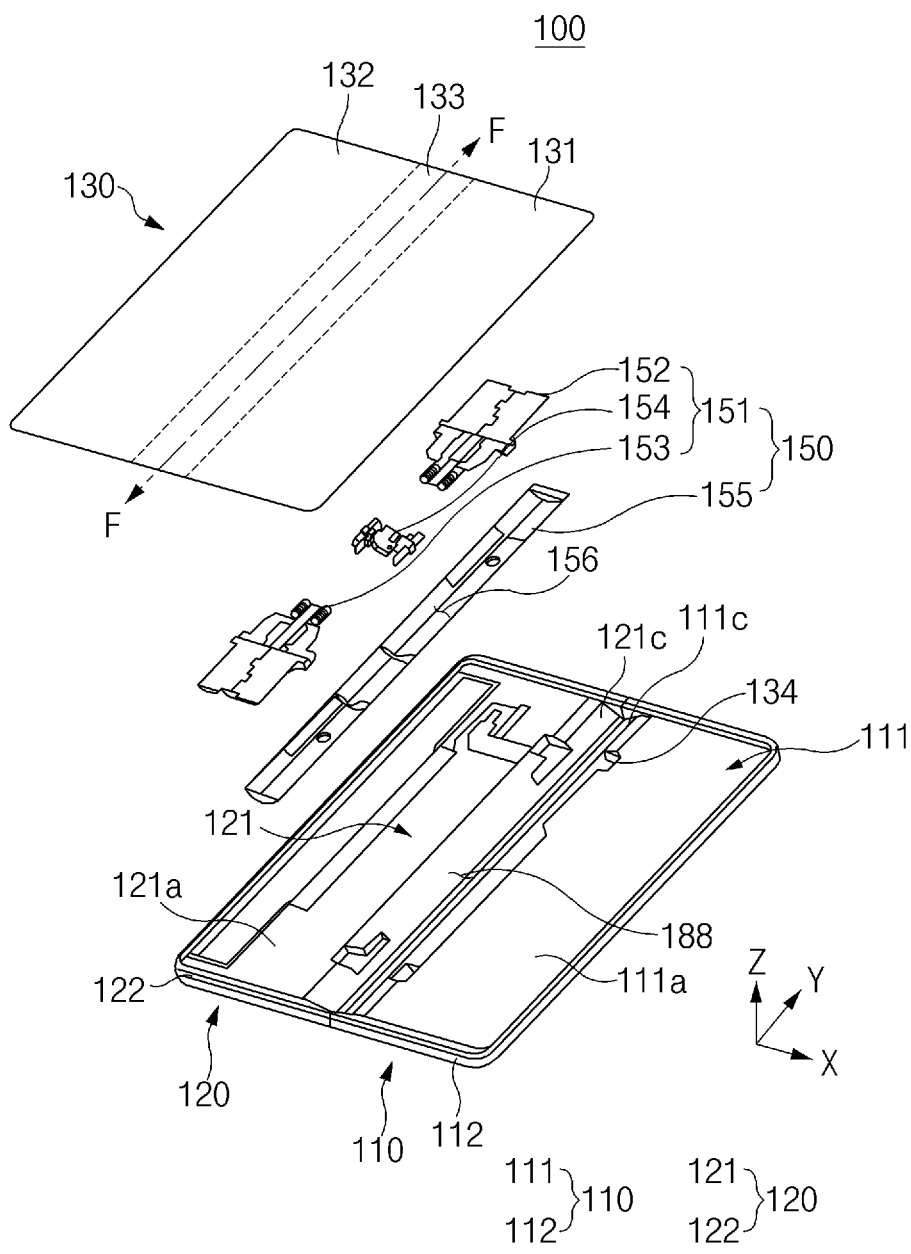
FIG. 3 is an exploded perspective view of an electronic device according to an embodiment of the disclosure.
Figure 4:
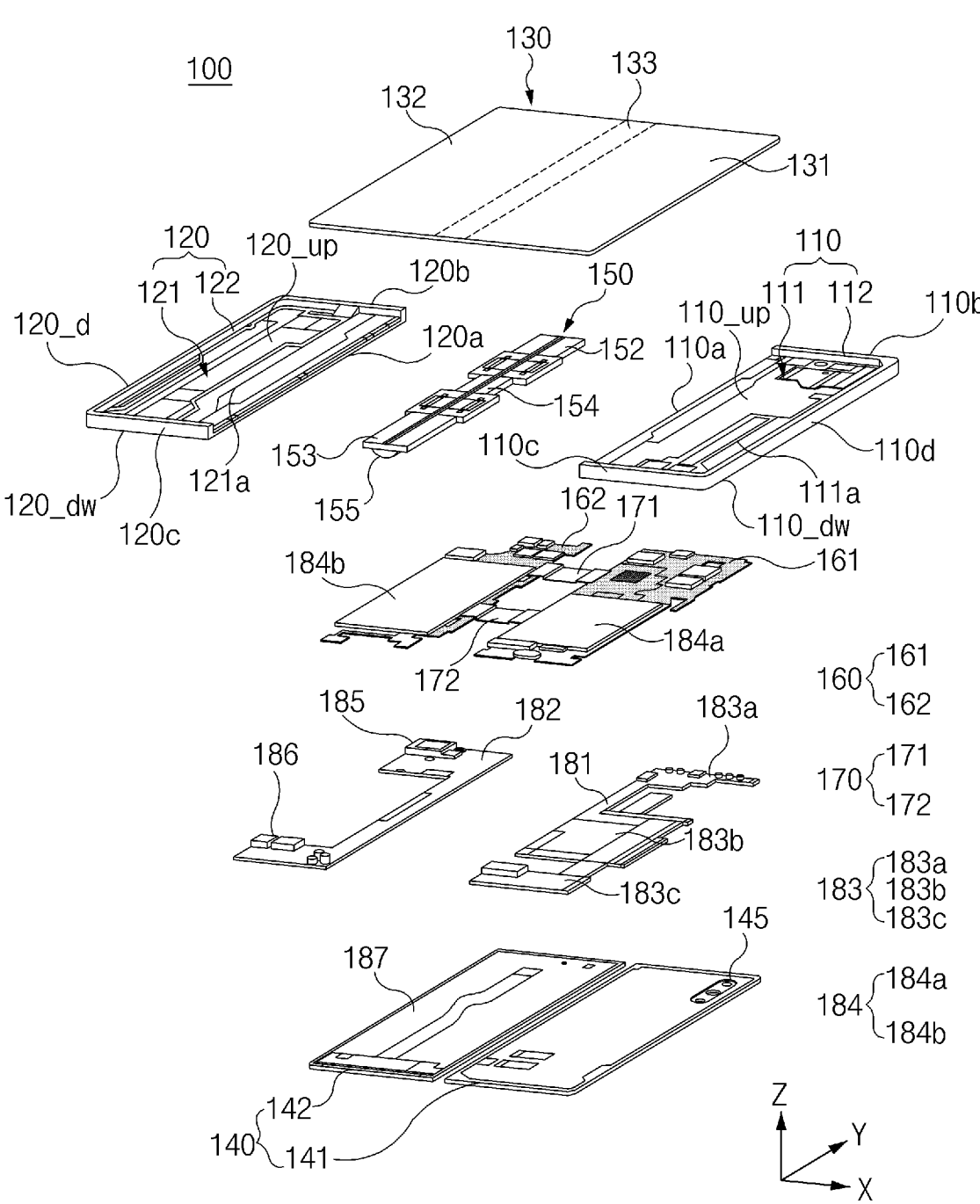
FIG. 4 is an exploded perspective view of an electronic device according to an embodiment of the disclosure.

FIG. 3 is an exploded perspective view of an electronic device according to an embodiment of the disclosure. FIG. 4 is an exploded perspective view of an electronic device according to an embodiment of the disclosure.

FIG. 4 is an exploded perspective view illustrating a state in which other parts disposed in a housing structures in FIG. 3 are disassembled.

Referring to FIGS. 3 and 4, the electronic device 100 according to an embodiment may include the first housing 110, the second housing 120, the display 130, the back cover 140, a hinge member 150, a circuit board 160, a connecting member 170, support members (e.g., rear cases) 181 and 182, the cover display 187, a battery 184, and antennas 183. Some of the components of the electronic device 100 illustrated in FIGS. 3 and 4 may be identical or similar to the components of the electronic device 100 described with reference to FIGS. 1 and 2, and repetitive descriptions will hereinafter be omitted.

The housing structures 110 and 120 may include plates (e.g., plate structures) 111 and 121 and the side members (e.g., side frame structures or side bezel structures) 112 and 122.

The first housing 110 may include the first plate 111 and the first side member 112 surrounding at least a portion of the periphery of the first plate 111. For example, the first side member 112 may surround the rest other than a portion of the periphery of the first plate 111 that faces toward the second housing 120 (e.g., an edge portion facing in the +x-axis direction). The first plate 111 may include the first surface 111*a* on which the display 130 is disposed and the second surface 111*b* facing away from the first surface 111*a*. In the illustrated embodiment of the disclosure, the first surface 111*a* may face in the +z-axis direction, and the second surface 111*b* may face in the −z-axis direction. The first plate 111 may be connected or integrally formed with the first side member 112. For example, the first housing 110 may include a first upper surface 110_*up* facing toward the rear surface (e.g., the surface facing in the −z-axis direction) of the display 130, a first lower surface 110_*dw* corresponding to the rear side of the first upper surface 110_*up*, and a first side part 110*a*, a second side part 110*b*, a third side part 110*c*, and a fourth side part 110*d* disposed to protrude from the periphery of the first upper surface 110_*up* toward the display 130. The first side part 110*a* may be disposed adjacent to the second housing 120, or may be coupled with the second housing 120 through the hinge member 150. The protruding height of the first side part 110*a* in the z-axis direction (or, the direction toward the display 130) may differ from the protruding heights of the other side parts (e.g., the second side part 110*b*, the third side part 110*c*, and the fourth side part 110*d*) in the z-axis direction. For example, the protruding height of the first side part 110*a* in the z-axis direction may be smaller than the protruding height of the second side part 110*b* (or, the third side part 110*c*) in the z-axis direction. Alternatively, the first side part 110*a* may have a shape that is open in the −x-axis direction based on the second side part 110*b*, the third side part 110*c*, and the fourth side part 110*d* that protrude in the z-axis direction by a predetermined height. The first side part 110*a* and the fourth side part 110*d* may be disposed parallel to each other with a predetermined gap therebetween, and the second side part 110*b* and the third side part 110*c* may be disposed parallel to each other with a predetermined gap therebetween. The second side part 110*b* may be disposed on the upper sides (e.g., the edges facing in the y-axis direction) of the first side part 110*a* and the fourth side part 110*d*, and the third side part 110*c* may be disposed on the lower sides (e.g., the edges facing in the −y-axis direction) of the first side part 110*a* and the fourth side part 110*d*. An antenna module (e.g., an antenna module 200 of FIG. 7) that will be described below may be disposed adjacent to the first side part 110*a* of the first housing 110. A through-hole (e.g., a first through-hole h1 of FIG. 5A or 5B that will be described below) through which the connecting member 170 is disposed may be disposed adjacent to the first side part 110*a* of the first housing 110. For example, the antenna module 200 may be disposed between the first through-hole h1 and the hinge cover 155 (or, a second sidewall part formed on the first side part 110*a* (e.g., a second sidewall part 116 of FIG. 10 that will be described below)).

The second housing 120 may include the second plate 121 and the second side member 122 surrounding at least a portion of the periphery of the second plate 121. For example, the second side member 122 may surround the rest other than a portion of the periphery of the second plate 121 that faces toward the first housing 110 (e.g., an edge portion facing in the −x-axis direction). The second plate 121 may include the third surface 121a on which the display 130 is disposed and the fourth surface 121b facing away from the third surface 121a. In the illustrated embodiment of the disclosure, the third surface 121a may face in the +z-axis direction, and the fourth surface 121b may face in the −z-axis direction. The second plate 121 may be connected or integrally formed with the second side member 122. For example, the second housing 120 may include a second upper surface 120_up that faces toward the rear surface (e.g., the surface facing in the −z-axis direction) of the display 130 and that is disposed to face the same direction as the first upper surface 110_up when the electronic device 100 is in an unfolded state, a second lower surface 120_dw corresponding to the rear side of the second upper surface 120_up, and a fifth side part 120a, a sixth side part 120b, a seventh side part 120c, and an eighth side part 120d disposed to protrude from the periphery of the second upper surface 120_up toward the display 130. The fifth side part 120a may be disposed adjacent to the first housing 110, or may be coupled with the first housing 110 through the hinge member 150. The protruding height of the fifth side part 120a in the z-axis direction (or, the direction toward the display 130) may differ from the protruding heights of the other side parts (e.g., the sixth side part 120b, the seventh side part 120c, and the eighth side part 120d) in the z-axis direction. For example, the protruding height of the fifth side part 120a in the z-axis direction may be smaller than the protruding height of the sixth side part 120b in the z-axis direction. Alternatively, similarly to the first side part 110a, the fifth side part 120a may have a shape that is open in the x-axis direction. The fifth side part 120a and the eighth side part 120d may be disposed parallel to each other with a predetermined gap therebetween, and the sixth side part 120b and the seventh side part 120c may be disposed parallel to each other with a predetermined gap therebetween. The fifth side part 120a and the eighth side part 120d may correspond to the first side part 110a and the fourth side part 110d of the first housing 110, and the sixth side part 120b and the seventh side part 120c may correspond to the second side part 110b and the third side part 110c of the first housing 110.

The housing structures 110 and 120 may include, between the first plate 111 and the second plate 121, a hinge recess 188 in which at least a portion of the hinge cover 155 is disposed. The hinge recess 188 may be formed such that at least a portion has a predetermined curvature to correspond to the shape of the hinge cover 155. A first support surface 111c and a second support surface 121c may hide the hinge cover 155 by covering the hinge cover 155 by forming the hinge recess 188 when the electronic device 100 is in an unfolded state (e.g., the state of FIG. 1). The first support surface 111c and the second support surface 121c may move to positions facing each other along the curved surface of the hinge cover 155 to expose the hinge cover 155 outside the electronic device 100.

The display 130 may be disposed on the first plate 111 of the first housing 110 and the second plate 121 of the second housing 120. The display 130 may be partially supported by the first surface 111a of the first plate 111 and the third surface 121a of the second plate 121. The display 130 may include the first region 131 disposed on the first plate 111, the second region 132 disposed on the second plate 121, and the folding region 133 located between the first region 131 and the second region 132. For example, at least a portion of the first region 131 may be attached to the first surface 111a of the first plate 111, and at least a portion of the second region 132 may be attached to the third surface 121a of the second plate 121.

The back cover 140 may include the first back cover 141 disposed to face the second surface 111b of the first plate 111 and the second back cover 142 disposed to face the fourth surface 121b of the second plate 121. For example, the first back cover 141 may be disposed under the first plate 111 (e.g., the −z-axis direction), and the second back cover 142 may be disposed under the second plate 121 (e.g., the −z-axis direction).

The first back cover 141 may be coupled to the first housing 110 to form, between the first back cover 141 and the first plate 111, a predetermined space in which other parts (e.g., a first circuit board 161, a first battery 184a, and the antennas 183) are accommodated. The second back cover 142 may be coupled to the second housing 120 to form, between the second back cover 142 and the second plate 121, a predetermined space in which other parts (e.g., a second circuit board 162, a second battery 184b, and speakers 185 and 186) are accommodated.

The second camera region 145 may be formed on the first back cover 141. For example, the second camera region 145 may be formed by a camera decoration member (or, camera deco) or may be provided in the form of the camera decoration member. The cover display 187 may be disposed on one surface of the second back cover 142. For example, the cover display 187 may be attached to one surface (e.g., a surface facing in the +z-axis direction) of the second back cover 142 that faces the second plate 121 and may be disposed between the second back cover 142 and the second plate 121.

The hinge member 150 may include the hinge structures (or, the hinge modules) 151 and the hinge cover 155. The hinge cover 155 may include an inner space 156 in which at least portions of the hinge structures 151 are accommodated. The hinge structures 151 may include a first hinge structure 152, a second hinge structure 153, and a third hinge structure 154 arranged in a direction parallel to the folding axis F. For example, the first hinge structure 152 may be disposed adjacent to the edges of the first housing 110 and the second housing 120 that face in the +y-axis direction. The second hinge structure 153 may be disposed adjacent to the edges of the first housing 110 and the second housing 120 that face in the −y-axis direction. The third hinge structure 154 may be disposed between the first hinge structure 152 and the second hinge structure 153. However, the illustrated embodiment is illustrative, and according to various embodiments of the disclosure, the third hinge structure 154 may be omitted.

The hinge structures 151 may rotatably connect the first housing 110 and the second housing 120. The hinge structures 151 may be disposed between the first housing 110 and the second housing 120 and may be coupled to the first housing 110 and the second housing 120. For example, each of the hinge structures 151 may be configured such that one portion is coupled to the hinge cover 155 and another portion is coupled to the first housing 110 and the second housing 120. The first housing 110 and the second housing 120 may rotate about the rotational axes formed by the hinge structures 151.

The circuit board 160 may include the first circuit board 161 disposed in the first housing 110 and the second circuit board 162 disposed in the second housing 120. The first circuit board 161 and the second circuit board 162 may be electrically connected through the connecting member 170. For example, the circuit board 160 may be a printed circuit board (PCB).

The first circuit board 161 may be accommodated in the space between the first plate 111 and the first back cover 141. The first circuit board 161 may be disposed under the first plate 111 (e.g., the −z-axis direction) and may face a portion of the second surface 111b of the first plate 111. For example, the first circuit board 161 may be disposed between the first plate 111 and the first support member 181 and may be supported by a partial region of the second surface 111b of the first plate 111.

The second circuit board 162 may be accommodated in the space between the second plate 121 and the second back cover 142. The second circuit board 162 may be disposed under the second plate 121 (e.g., the −z-axis direction) and may face a portion of the fourth surface 121b of the second plate 121. For example, the second circuit board 162 may be disposed between the second plate 121 and the second support member 182 and may be supported by a partial region of the fourth surface 121b of the second plate 121.

The circuit board 160 may have a processor, a memory, and/or an interface disposed thereon. For example, the processor may include one or more of a central processing unit, an application processor, a graphic processing unit, an image signal processor, a sensor hub processor, or a communication processor. For example, the memory may include a volatile memory or a non-volatile memory. For example, the interface may include a high definition multimedia interface (HDMI), a universal serial bus (USB) interface, a secure digital (SD) card interface, and/or an audio interface. The interface may electrically or physically connect the electronic device 100 with an external electronic device and may include a USB connector, an SD card/multimedia card (MMC) connector, or an audio connector.

The connecting member 170 may electrically connect the first circuit board 161 and the second circuit board 162. One end portion of the connecting member 170 may be connected to the first circuit board 161, and an opposite end portion of the connecting member 170 may be connected to the second circuit board 162. For example, connectors may be formed on the opposite end portions of the connecting member 170. The connecting member 170 may extend in a direction substantially perpendicular to the folding axis F and may cross the first housing 110, the hinge cover 155, and the second housing 120. For example, a central portion of the connecting member 170 may extend across the hinge cover 155, and the opposite end portions of the connecting member 170 may be connected to the first circuit board 161 disposed on the first plate 111 and the second circuit board 162 disposed on the second plate, respectively. The connecting member 170 may be formed of a flexible conductive material and may be moved or deformed in response to folding and unfolding operations of the electronic device 100. For example, the connecting member 170 may be a flexible printed circuit board (FPCB).

The connecting member 170 may include a first connecting member 171 and a second connecting member 172. The first connecting member 171 and the second connecting member 172 may be connected to different regions of the first circuit board 161 and the second circuit board 162, respectively. Between the first hinge structure 152 and third hinge structure 154, the first connecting member 171 may extend across the hinge cover 155. For example, in the inner space 156 of the hinge cover 155, a portion of the first connecting member 171 may be located or accommodated in a space between the first hinge structure 152 and the third structure 154. Between the second hinge structure 153 and the third hinge structure 154, the second connecting member 172 may extend across the hinge cover 155. For example, in the inner space 156 of the hinge cover 155, a portion of the second connecting member 172 may be located or accommodated in a space between the second hinge structure 153 and the third structure 154.

For example, a first part of the connecting member 170 may be placed on the first upper surface 110_up (or, the first lower surface 110_dw) of the first housing 110, a second part of the connecting member 170 may be placed on the hinge cover 155, and a third part of the connecting member 170 may be placed on the second upper surface 120_up (or, the second lower surface 120_dw) of the second housing 120. The first housing 110 may include at least one through-hole through which the connecting member 170 passes. The at least one through-hole may be formed to penetrate the first upper surface 110_up and the first lower surface 110_dw in the up/down direction. The at least one through-hole of the first housing 110 may be formed adjacent to the first side part 110a of the first housing 110. One portion of the first part of the connecting member 170 may be connected to the first circuit board 161 placed between the first lower surface 110_dw of the first housing 110 and the first back cover 141, and another portion of the first part of the connecting member 170 may be placed on the first upper surface 110_up through the at least one through-hole of the first housing 110. Similarly, the second housing 120 may include at least one through-hole through which the connecting member 170 passes. The at least one through-hole may be formed to penetrate the second upper surface 120_up and the second lower surface 120_dw in the up/down direction. The at least one through-hole of the second housing 120 may be formed adjacent to the fifth side part 120a of the second housing 120. One portion of the third part of the connecting member 170 may be connected to the second circuit board 162 placed between the second lower surface 120_dw of the second housing 120 and the second back cover 142, and another portion of the third part of the connecting member 170 may be placed on the second upper surface 120_up through the at least one through-hole of the second housing 120.

According to an embodiment, the connecting member 170 may extend to pass through through-holes (e.g., through-holes h1, h2, h3, and h4 of FIGS. 5A and 5B) formed in the first plate 111 and the second plate 121. The structure in which the connecting member 170 extends through the through-holes h1, h2, h3, and h4 will be described below in more detail with reference to FIGS. 5A and 5B.

The support members 181 and 182 may be disposed between the circuit board 160 and the back cover 140. The support members 181 and 182 may include the first support member 181 disposed in the first housing 110 and the second support member 182 disposed in the second housing 120. For example, the first support member 181 may be disposed between the first circuit board 161 and the first back cover 141. The second support member 182 may be disposed between the second circuit board 162 and the second back cover 142 or between the second circuit board 162 and the cover display 187.

One or more antennas 183 may be disposed or formed on the first support member 181. The speaker modules 185 and 186 may be disposed on the second support member 182. For example, the first speaker module 185 (e.g., an upper speaker module) may be disposed on an upper end portion (e.g., the +y-axis direction) of the second support member 182, and the second speaker module 186 (e.g., a lower speaker module) may be disposed on a lower end portion (e.g., the −y-axis direction) of the second support member 182.

The battery 184 may be a device for supplying power to at least one component of the electronic device 100. The battery 184 may include, for example, a primary cell that is not rechargeable, a secondary cell that is rechargeable, or a fuel cell. The battery 184 may include the first battery 184*a* disposed in the first housing 110 and the second battery 184*b* disposed in the second housing 120. The first battery 184*a* may be coupled to the first circuit board 161, and the second battery 184*b* may be coupled to the second circuit board 162.

The antennas (or, antenna structures) 183 may be formed by portions of the side members 112 and 122 and/or the support members 181 and 182, or a combination thereof. For example, the antennas 183 may include a first antenna (e.g., an upper antenna) 183*a* disposed or formed on one side (e.g., the +y-axis direction) of the first support member 181, a second antenna (e.g., a lower antenna) 183*b* disposed or formed on an opposite side (e.g., the −y-axis direction) of the first support member 181, and a third antenna 183*c* disposed or formed between the first antenna 183*a* and the second antenna 183*b*. The antennas 183 may include an ultra-wide band (UWB) antenna, a near field communication (NFC) antenna, a wireless charging antenna (e.g., an NFC antenna), and/or a magnetic secure transmission (MST) antenna. For example, the antennas 183 may perform short-range communication with an external device, or may wirelessly transmit and receive power required for charging. Although not illustrated in FIGS. 3 and 4, the electronic device 100 may further include an antenna module (e.g., the antenna module 200 of FIG. 7) disposed in at least one of the first housing 110 or the second housing 120. An arrangement structure of the antenna module 200 will be described below with reference to FIGS. 10, 11, 12, 13A, and 13B.

Figure 5A:
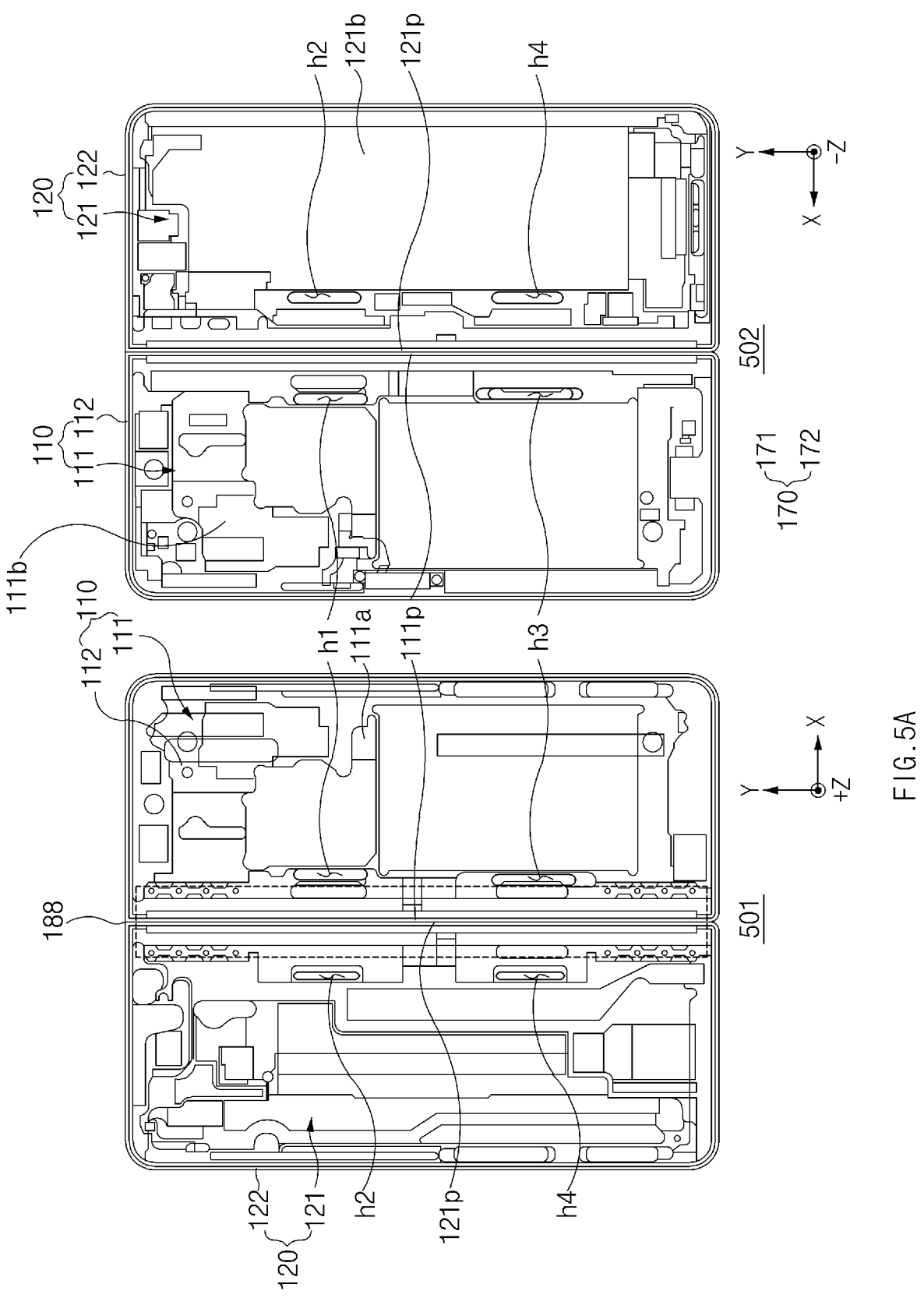
FIG. 5A is a view illustrating a first housing and a second housing of an electronic device according to an embodiment of the disclosure.
Figure 5B:
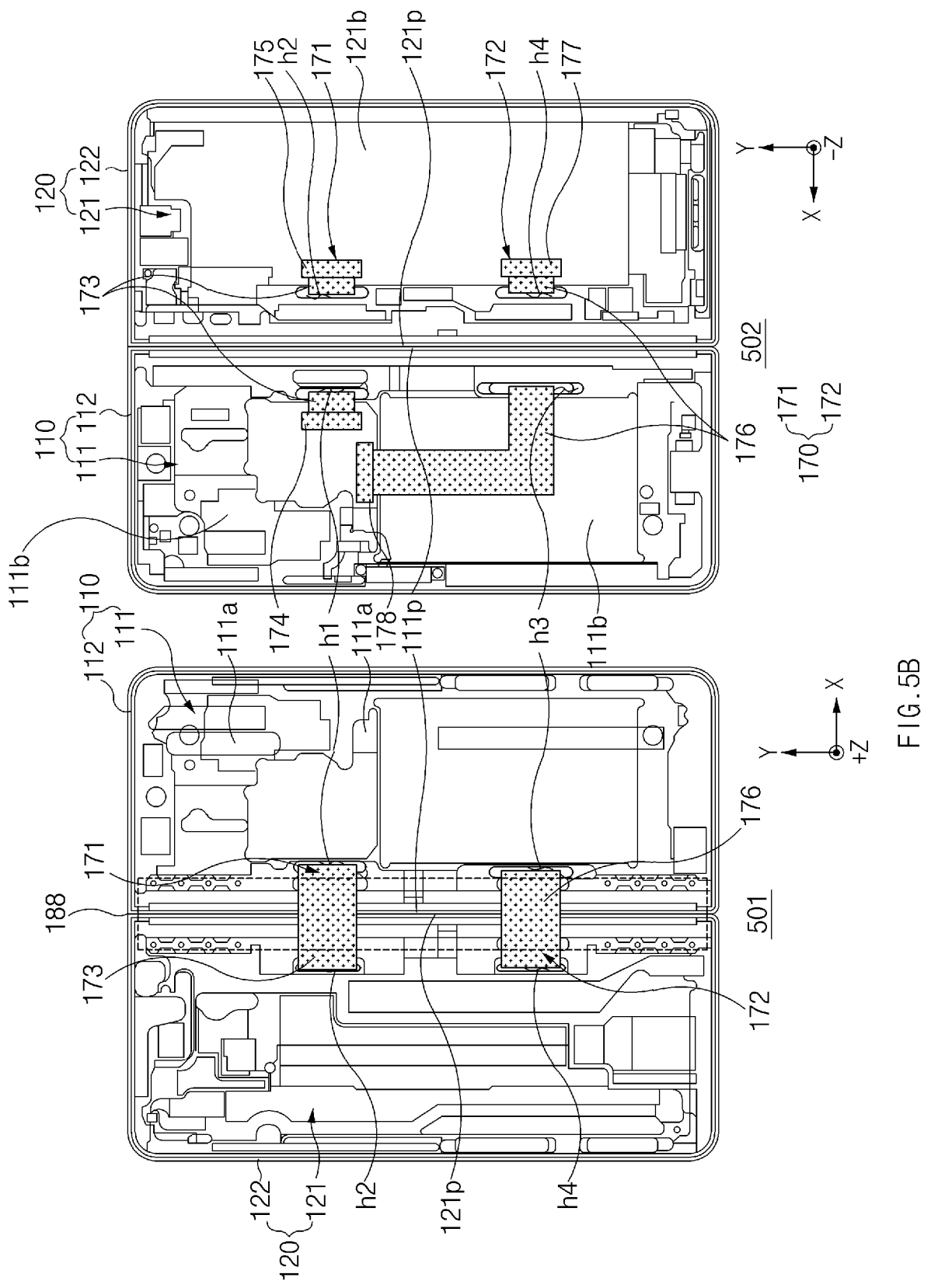
FIG. 5B is a view illustrating a first housing, a second housing, and a connecting member of an electronic device according to an embodiment of the disclosure.

FIG. 5A is a view illustrating a first housing and a second housing of an electronic device according to an embodiment of the disclosure. FIG. 5B is a view illustrating a first housing, a second housing, and a connecting member of an electronic device according to an embodiment of the disclosure.

<501> of FIG. 5A and <501> of FIG. 5B are plan views of the housing structures when the front surfaces of the first housing and the second housing are viewed from above, and <502> of FIG. 5A and <502> of FIG. 5B are plan views of the housing structures when the rear surfaces of the first housing and the second housing are viewed from above. FIG. 5B illustrates a state in which the connecting member is disposed across a portion of the first housing and a portion of the second housing.

Referring to FIGS. 4, 5A and 5B, the electronic device 100 according to an embodiment may include the first housing 110, the second housing 120, and the connecting member 170.

The first housing 110 may include the first plate 111 (or, the first frame or the first bracket) and the first side member 112 (e.g., the first to fourth side parts 110*a*, 110*b*, 110*c*, and 110*d*). The first plate 111 may include the first surface 111*a* (e.g., the front surface or the first upper surface 110_*up*) and the second surface 111*b* (e.g., the rear surface or the first lower surface 110_*dw*) facing away from the first surface 111*a*. Referring to FIG. 4 together, the first surface 111*a* may face toward the display (e.g., the display 130 of FIGS. 1 to 4), and the second surface 111*b* may face toward the first back cover (e.g., the first back cover 141 of FIGS. 1 and 2) or the first circuit board (e.g., the first circuit board 161 of FIG. 4). For example, the first surface 111*a* may face in the +z-axis direction, and the second surface 111*b* may face in the −z-axis direction. The first side member 112 may surround a portion of the periphery of the first plate 111. For example, the first side member 112 may surround edges of the first plate 111 that face in the +y-axis direction, the −y-axis direction, and the +x-axis direction, respectively. A first edge 111P (e.g., an edge facing in the −x-axis direction) of the first plate 111 may face a second edge 121P of the second plate 121 without being surrounded by the first side member 112.

The second housing 120 may include the second plate 121 (or, the second frame or the second bracket) and the second side member 122 (e.g., the fifth to eighth side parts 120*a*, 120*b*, 120*c*, and 120*d*). The second plate 121 may include the third surface 121*a* (e.g., the front surface or the second upper surface 120_*up*) and the fourth surface 121*b* (e.g., the rear surface or the second lower surface 120_*dw*) facing away from the third surface 121*a*. Referring to FIG. 4 together, the third surface 121*a* may face toward the display 130, and the fourth surface 121*b* may face toward the second back cover (e.g., the second back cover 142 of FIGS. 1 and 2) or the second circuit board (e.g., the second circuit board 162 of FIG. 4). For example, the third surface 121*a* may face in the +z-axis direction, and the fourth surface 121*b* may face in the −z-axis direction. The second side member 122 may surround a portion of the periphery of the second plate 121. For example, the second side member 122 may surround edges of the second plate 121 that face in the +y-axis direction, the −y-axis direction, and the −x-axis direction, respectively. The second edge 121P (e.g., an edge facing in the +x-axis direction) of the second plate 121 may face the first edge 111P of the first plate 111 without being surrounded by the second side member 122.

The hinge region 188 (e.g., the hinge recess 188 of FIG. 3), in which the hinge cover 155 is disposed, may be formed or defined in the portions of the first housing 110 and the second housing 120 where the first plate 111 and the second plate 121 are in contact with each other when the electronic device 100 is in an unfolded state (e.g., the state of FIG. 1). For example, the hinge region 188 may be formed in a position overlapping the first edge 111*p* of the first plate 111 and the second edge 121*p* of the second plate 121. When the electronic device 100 is in a folded state, the first surface 111*a* of the first plate 111 and the third surface 121*a* of the second plate 121 may face each other. When the electronic device 100 is in an unfolded state, the first surface 111*a* of the first plate 111 and the third surface 121*a* of the second plate 121 may face in the same direction.

The connecting member 170 may include the first connecting member 171 and the second connecting member 172. Although not illustrated in FIGS. 5A and 5B, each of the first connecting member 171 and the second connecting member 172 may be electrically and physically connected to the first circuit board 161 disposed on the second surface 111*b* of the first plate 111 and the second circuit board 162 disposed on the fourth surface 121*b* of the second plate 121.

A first connector 174 and a second connector 175 may be formed on opposite end portions of the first connecting member 171. For example, the first connecting member 171 may include a first wiring member 173 and the connectors 174 and 175 disposed at opposite ends of the first wiring member 173. A third connector 177 and a fourth connector 178 may be formed on opposite end portions of the second connecting member 172. For example, the second connecting member 172 may include a second wiring member 176 and the connectors 176 and 177 formed at opposite ends of the second wiring member 176.

The first connector 174 of the first connecting member 171 and the third connector 177 of the second connecting member 172 may be disposed on the second surface 111b of the first plate 111. The second connector 175 of the first connecting member 171 and the fourth connector 178 of the second connecting member 172 may be disposed on the fourth surface 121b of the second plate 121. For example, the first connector 174 of the first connecting member 171 and the third connector 177 of the second connecting member 172 may be electrically connected to the first circuit board 161 disposed on the second surface 111b. For example, the second connector 175 of the first connecting member 171 and the fourth connector 178 of the second connecting member 172 may be electrically connected to the second circuit board 162 disposed on the fourth surface 121b.

The first connecting member 171 may extend to pass through the through-holes h1 and h2 of the first plate 111 and the second plate 121. The first through-hole h1 may be formed through the first plate 111, and the second through-hole h2 may be formed through the second plate 121. The first through-hole h1 may be formed adjacent to the first edge 111p of the first plate 111, and the second through-hole h2 may be formed adjacent to the second edge 121p of the second plate 121. The first through-hole h1 and the second through-hole h2 may be located in a direction perpendicular to the folding axis F with the hinge region 188 therebetween. For example, the hinge region 188 (or, the hinge cover (e.g., the hinge cover 155 of FIGS. 1 to 4)) may be disposed between the first through-hole h1 and the second through-hole h2.

The first connecting member 171 may extend from the second surface 111b of the first plate 111 to the first surface 111a of the first plate 111 through the first through-hole h1, may extend to the third surface 121a of the second plate 121 across the first edge 111p and the second edge 121p, and may extend to the fourth surface 121b of the second plate 121 through the second through-hole h2.

The first connecting member 171 may be provided in a structure in which the first wiring member 173 passes through the first through-hole h1 and the second through-hole h2 across a partial region (e.g., the hinge region 188) of the first surface 111a of the first plate 111 and the third surface 121a of the second plate 121 and the first connector 174 and the second connector 175 disposed on the opposite end portions of the first wiring member 173 are disposed on the second surface 111b of the first plate 111 and the fourth surface 121b of the second plate 121, respectively. For example, the first wiring member 173 of the first connecting member 171 may extend through the first through-hole h1 from the first connector 174 disposed on the second surface 111b of the first plate 111 and may be located on the first surface 111a of the first plate 111. The first wiring member 173 may extend across the hinge region 188 so as to be located on the third surface 121a of the second plate 121 and may extend through the second through-hole h2 to the second connector 175 disposed on the fourth surface 121b of the second plate 121.

The second connecting member 172 may extend to pass through the through-holes h3 and h4 of the first plate 111 and the second plate 121. The third through-hole h3 may be formed through the first plate 111, and the fourth through-hole h4 may be formed through the second plate 121. The third through-hole h3 may be formed adjacent to the first edge 111p of the first plate 111, and the fourth through-hole h4 may be formed adjacent to the second edge 121p of the second plate 121. The third through-hole h3 and the fourth through-hole h4 may be located in a direction perpendicular to the folding axis F with the hinge region 188 therebetween. For example, the hinge region 188 (or, the hinge cover 155) may be disposed between the third through-hole h3 and the fourth through-hole h4. The third through-hole h3 may be spaced apart from the first through-hole h1 by a predetermined distance in the direction of the folding axis F (e.g., the −y-axis direction), and the fourth through-hole h4 may be spaced apart from the second through-hole h2 by a predetermined distance in the direction of the folding axis F (e.g., the −y-axis direction).

The second connecting member 172 may extend from the second surface 111b of the first plate 111 to the first surface 111a of the first plate 111 through the third through-hole h3, may extend to the third surface 121a of the second plate 121 across the first edge 111p and the second edge 121p, and may extend to the fourth surface 121b of the second plate 121 through the fourth through-hole h4.

The second connecting member 172 may be provided in a structure in which the second wiring member 176 passes through the third through-hole h3 and the fourth through-hole h4 across a partial region (e.g., the hinge region 188) of the first surface 111a of the first plate 111 and the third surface 121a of the second plate 121 and the third connector 177 and the fourth connector 178 disposed on the opposite end portions of the second wiring member 176 are disposed on the second surface 111b of the first plate 111 and the fourth surface 121b of the second plate 121, respectively. For example, the second wiring member 176 of the second connecting member 172 may extend through the third through-hole h3 from the third connector 177 disposed on the second surface 111b of the first plate 111 and may be located on the first surface 111a of the first plate 111. The second wiring member 176 may extend across the hinge region 188 so as to be located on the third surface 121a of the second plate 121 and may extend through the fourth through-hole h4 to the fourth connector 178 disposed on the fourth surface 121b of the second plate 121.

According to an embodiment, the electronic device 100 may include various parts that are disposed in the first housing 110 and the second housing 120. Additionally or alternatively, slimness of the electronic device 100 is in progress in relation to weight reduction and thickness optimization. Correspondingly, the inner space of the electronic device 100 may be narrowed, and various parts required for operating the electronic device 100 may be disposed in the narrow space with high density. Among the parts, specific parts may be electronic parts and therefore may electrically affect other parts. Accordingly, to improve space utilization efficiency by more three-dimensionally using the inner space of the electronic device 100, an antenna module (e.g., the antenna module 200 of FIG. 7) related to a communication function of the electronic device 100 and the connecting member 170 may be disposed to at least partially overlap each other when viewed in the z-axis direction. In the above-described arrangement structure, the through-holes h1 and h2 formed in the first housing 110 and the second housing 120 may be used to reduce an electrical influence between the antenna module and the connecting member 170, and at least a portion of a structure around a through-hole through which the antenna module is disposed among the through-holes may be cut or may have a bent shape (or, a curved shape) such that the radiation efficiency of the antenna module is higher than or equal to a predefined reference value.

The first plate 111 may include an antenna seating portion (e.g., an antenna mounting portion or an antenna receiving portion) in which the antenna module (e.g., the antenna module 200 of FIG. 7) is disposed. The antenna seating portion (e.g., an antenna seating portion 114 of FIG. 7) may be formed on the second surface 111b of the first plate 111. For example, the antenna seating portion 114 may be formed or defined by a partial region of the second surface 111b. The antenna seating portion 114 may be located adjacent to the first through-hole h1. For example, the antenna seating portion 114 may be formed between the first edge 111p of the first plate 111 and the first through-hole h1. According to various embodiments of the disclosure, the antenna seating portion 114 may be located between the first through-hole h1 and the hinge cover 155 in a state in which the hinge cover 155 is disposed in the hinge region 188. The antenna module 200 and the antenna seating portion 114 will be described below in more detail with reference to FIGS. 10, 11, 12, 13A, and 13B.

Figure 6:
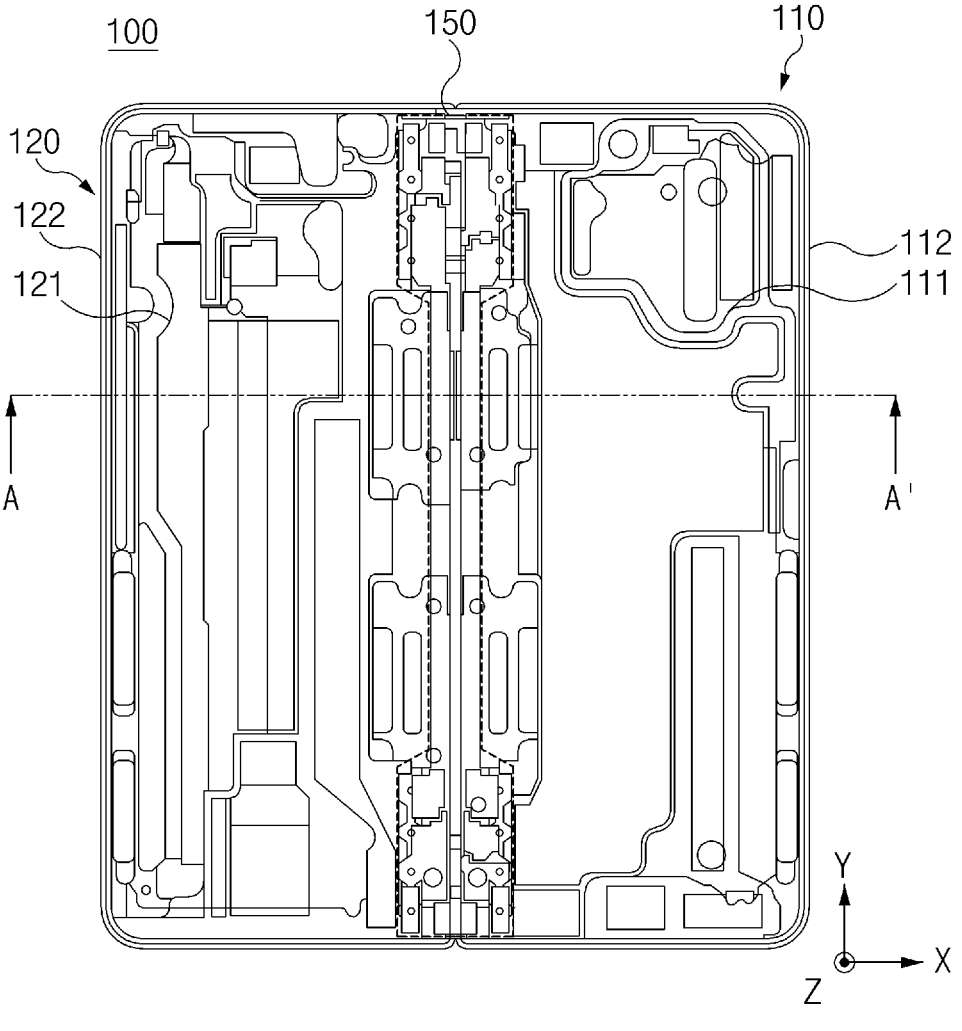
FIG. 6 is a plan view of an electronic device according to an embodiment of the disclosure.
Figure 7:
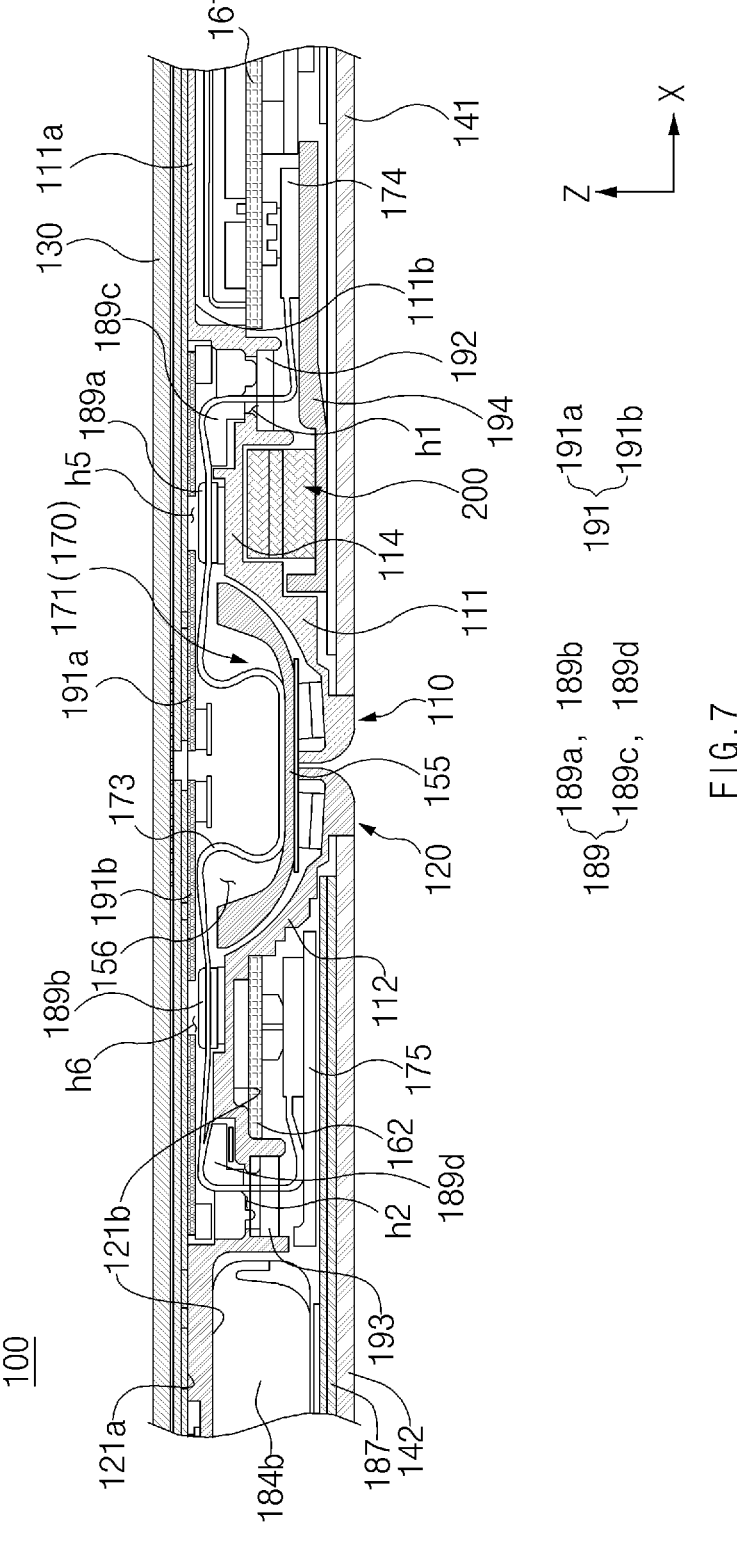
FIG. 7 is a sectional view of an electronic device according to an embodiment of the disclosure.
Figure 8:
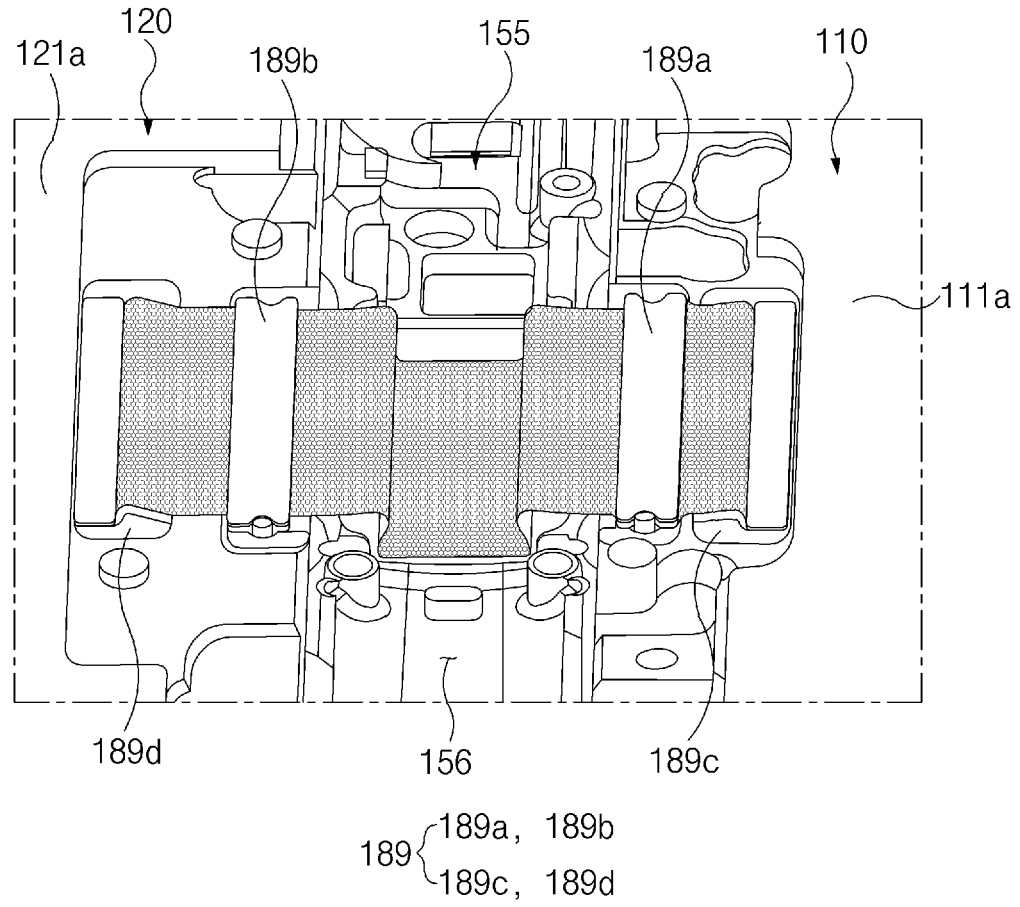
FIG. 8 is a view illustrating an arrangement structure of a connecting member according to an embodiment of the disclosure.
Figure 9:
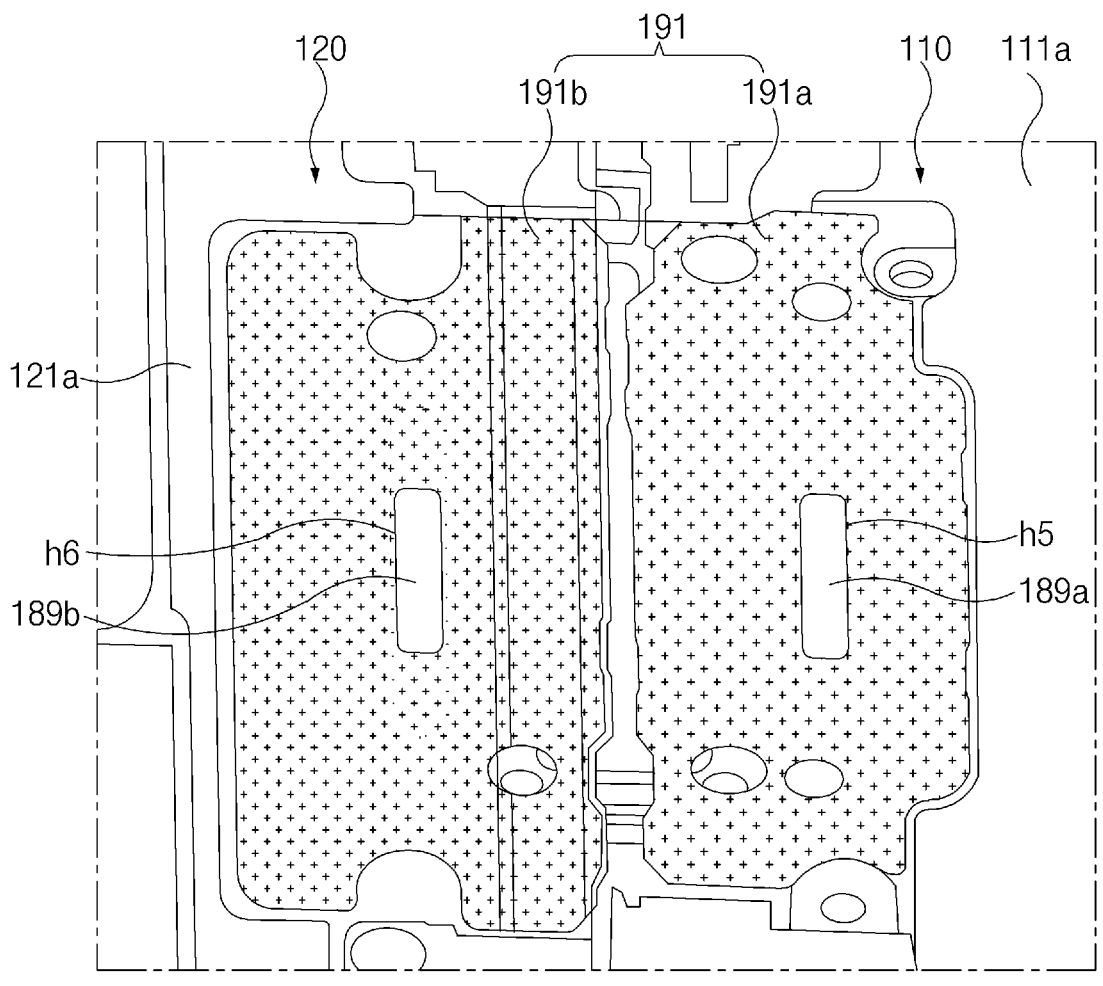
FIG. 9 is a view illustrating an arrangement structure of a connecting member according to an embodiment of the disclosure.

FIG. 6 is a plan view of an electronic device according to an embodiment of the disclosure. FIG. 7 is a sectional view of an electronic device according to an embodiment of the disclosure. FIG. 8 is a view illustrating an arrangement structure of a connecting member according to an embodiment of the disclosure. FIG. 9 is a view illustrating an arrangement structure of a connecting member according to an embodiment of the disclosure.

FIG. 6 is a view in which a display is omitted from a front plan view of an electronic device illustrated in FIG. 1. FIG. 7 is a sectional view of an electronic device taken along line A-A' in FIG. 6.

Referring to FIGS. 6, 7, 8, and 9, the electronic device 100 according to an embodiment may include the first housing 110, the second housing 120, the display 130, the back cover 140, the hinge member 150, the circuit board 160, the connecting member 170, a rear case 194, the cover display 187, a fixing member 189, a reinforcing member 191, and the antenna module 200. Some of the components of the electronic device 100 illustrated in FIGS. 6 to 9 may be identical or similar to the components of the electronic device 100 described with reference to FIGS. 3, 4, 5A, and 5B, and repetitive descriptions will hereinafter be omitted.

The first housing 110 may include the first side member 112 and the first plate 111. The first plate 111 may include the first surface 111a on which the display 130 is disposed and the second surface 111b facing away from the first surface 111a. The antenna module 200 and the first circuit board 161 may be disposed on the second surface 111b of the first plate 111. For example, the antenna module 200 and the first circuit board 161 may be disposed or accommodated in the space between the first back cover 141 and the first plate 111.

The first plate 111 may have the first through-hole h1 formed therein through which at least a portion of the first connecting member 171 passes. The first through-hole h1 may be located between the hinge cover 155 and the first circuit board 161. The antenna seating portion 114 on which the antenna module 200 is seated may be formed on the first plate 111. The antenna seating portion 114 may be located between the hinge cover 155 and the first through-hole h1. The antenna seating portion 114 may provide a space in which at least a portion of the antenna module 200 is accommodated. A first waterproof member 192 may be disposed in the first through-hole h1. The first waterproof member 192 may be formed of a liquid material having a predetermined viscosity and may be closely disposed in the first through-hole h1 and/or a sidewall structure surrounding the first through-hole h1. The first connecting member 171 may extend through the first waterproof member 192. The first waterproof member 192 may prevent moisture or foreign matter from being introduced into the space between the first plate 111 and the first back cover 141.

The second housing 120 may include the second side member 122 and the second plate 121. The second plate 121 may include the third surface 121a on which the display 130 is disposed and the fourth surface 121b facing away from the third surface 121a. The second circuit board 162 may be disposed on the fourth surface 121b of the first plate 111. For example, the second circuit board 162 may be disposed or accommodated in the space between the second back cover 142 and the first plate 111. The cover display 187 may be disposed between the second back cover 142 and the second plate 121. For example, the cover display 187 may be attached to the rear surface (e.g., a surface facing in the +z-axis direction) of the second back cover 142 that faces the second plate 121.

The second plate 121 may have the second through-hole h2 formed therein through which at least a portion of the first connecting member 171 passes. The second through-hole h2 may be located between the second battery 184b and the second circuit board 162. A second waterproof member 193 may be disposed in the second through-hole h2. The second waterproof member 193 may be formed of a liquid material having a predetermined viscosity and may be closely disposed in the second through-hole h2 and/or a sidewall structure surrounding the second through-hole h2. The first connecting member 171 may extend through the second waterproof member 193. The second waterproof member 193 may prevent moisture or foreign matter from being introduced into the space between the second plate 121 and second first back cover 142.

The first connecting member 171 may extend from the first plate 111 to the second plate 121 across the hinge cover 155. At least a portion of the first connecting member 171 may be disposed in the inner space 156 of the hinge cover 155. For example, the first connecting member 171 may include the first wiring member 173 and the first and second connectors 174 and 175 disposed on the opposite end portions of the first wiring member 173. The first wiring member 173 may be at least partially disposed in the inner space 156 of the hinge cover 155 and may extend to the first circuit board 161 and the second circuit board 162 through the first through-hole h1 and the second through-hole h2. The first connector 174 may be connected to the first circuit board 161, and the second connector 175 may be connected to the second circuit board 162. The first wiring member 173 may be at least partially bent. For example, the first wiring member 173 may pass through the first through-hole h1 and the second through-hole h2 and may be partially bent so as to be accommodated in the hinge cover 155. According to various embodiments of the disclosure, the shape of a partial region of the first wiring member 173 disposed in the inner space 156 of the hinge cover 155 may be partially changed depending on folding and unfolding operations of the electronic device 100.

Referring to FIG. 7, the first connector 174 may be coupled to the first circuit board 161 disposed on the second surface 111b of the first plate 111, and the first wiring member 173 may extend from the first connector 174 to the first surface 111a of the first plate 111 through the first through-hole h1. The first wiring member 173 extending to the first surface 111a of the first plate 111 may extend into the inner space 156 of the hinge cover 155. The first wiring member 173 extending into the inner space 156 of the hinge cover 155 may extend to the third surface 121a of the second plate 121. The first wiring member 173 extending to the third surface 121a of the second plate 121 may extend to the fourth surface 121*b* of the second plate 121 through the second through-hole h2, and the second connector 175 may be coupled to the second circuit board 162 disposed on the fourth surface 121*b* of the second plate 121. Accordingly, the first connecting member 171 may cross the hinge cover 155 and may electrically connect the first circuit board 161 disposed on the second surface 111*b* and the second circuit board 162 disposed on the fourth surface 121*b*.

Referring to FIGS. 7 and 8, the first connecting member 171 may be fixed to the first plate 111 and the second plate 121 through the fixing member 189. The fixing member 189 may include fixing plates 189*a* and 189*b* and fixing brackets 189*c* and 189*d*. For example, the fixing member 189 may include the first fixing plate 189*a* and the first fixing bracket 189*c* for fixing the first connecting member 171 to the first plate 111 and the second fixing plate 189*b* and the second fixing bracket 189*d* for fixing the first connecting member 171 to the second plate 121.

The first fixing plate 189*a* may be disposed to overlap a portion of the first connecting member 171 and may be coupled to the first plate 111. For example, at least a portion of the first wiring member 173 may be disposed between the first fixing plate 189*a* and the first surface 111*a* of the first plate 111 and may be fixed to the first plate 111 as the first fixing plate 189*a* is fixedly coupled to the first plate 111. For example, the first fixing plate 189*a* may include a SUS material. However, without being limited thereto, the first fixing plate 189*a* may be formed of a material having rigidity sufficient to fix the first connecting member 171.

The first fixing bracket 189*c* may be at least partially disposed in the first through-hole h1 and may guide the first connecting member 171 such that the first connecting member 171 passes through the first through-hole h1. For example, the first fixing bracket 189*c* may be fixed to the first plate 111 so as to be partially inserted into the first through-hole h1. The first fixing bracket 189*c* may include a curved surface to which the first wiring member 173 is fixed, and the first wiring member 173 may be bent along the curved surface of the first fixing bracket 189*c* and may pass through the first through-hole h1. The first fixing bracket 189*c* may prevent an overflow of the first waterproof member 192 in a liquid state that is accommodated in the first through-hole h1. The first fixing bracket 189*c* may be formed of a material having ductility. For example, the first fixing bracket 189*c* may be formed of a rubber material, but is not limited thereto.

The second fixing plate 189*b* may be disposed to overlap a portion of the first connecting member 171 and may be coupled to the second plate 121. For example, at least a portion of the first wiring member 173 may be disposed between the second fixing plate 189*b* and the third surface 121*a* of the second plate 121 and may be fixed to the second plate 121 as the second fixing plate 189*b* is fixedly coupled to the second plate 121. For example, the second fixing plate 189*b* may be formed of a material substantially the same as that of the first fixing plate 189*a* or may be formed in a shape substantially the same as that of the first fixing plate 189*a*.

The second fixing bracket 189*d* may be at least partially disposed in the second through-hole h2 and may guide the first connecting member 171 such that the first connecting member 171 passes through the second through-hole h2. For example, the second fixing bracket 189*d* may be fixed to the second plate 121 so as to be partially inserted into the second through-hole h2. The second fixing bracket 189*d* may include a curved surface to which the first wiring member 173 is fixed, and the first wiring member 173 may be bent along the curved surface of the second fixing bracket 189*d* and may pass through the second through-hole h2. The second fixing bracket 189*d* may prevent an overflow of the second waterproof member 193 in a liquid state that is accommodated in the second through-hole h2. The second fixing bracket 189*d* may be formed of a material substantially the same as that of the first fixing bracket 189*c* or may be formed in a shape substantially the same as that of the first fixing bracket 189*c*.

Although the arrangement structure and the fixing structure of the first connecting member 171 have been described based on the first connecting member 171, the above description of the first connecting member 171 may be identically applied to the second connecting member (e.g., the second connecting member 172 of FIG. 5B).

Referring to FIGS. 7 and 9, the reinforcing member 191 may be disposed between partial regions of the first and second plates 111 and 121 and the display 130. The reinforcing member 191 may include a first reinforcing member 191*a* disposed on the first plate 111 and a second reinforcing member 191*b* disposed on the second plate 121. For example, the first reinforcing member 191*a* may be disposed between a partial region of the first surface 111*a* of the first plate 111 and the display 130. For example, the second reinforcing member 191*b* may be disposed between a partial region of the third surface 121*a* of the second plate 121 and the display 130.

The first reinforcing member 191*a* may compensate for a step between a region of the first surface 111*a* of the first plate 111 on which the first connecting member 171 is disposed and another region. Accordingly, the display 130 may be attached flat on the first plate 111. For example, the first reinforcing member 191*a* may be disposed to overlap the first connecting member 171, the first fixing plate 189*a*, and the first through-hole h1. The first reinforcing member 191*a* may have an opening h5 formed therein through which at least a portion of the first fixing plate 189*a* is exposed.

The second reinforcing member 191*b* may compensate for a step between a region of the third surface 121*a* of the second plate 121 on which the first connecting member 171 is disposed and another region. Accordingly, the display 130 may be attached flat on the second plate 121. For example, the second reinforcing member 191*b* may be disposed to overlap the first connecting member 171, the second fixing plate 189*b*, and the second through-hole h2. The second reinforcing member 191*b* may have an opening h6 formed therein through which at least a portion of the second fixing plate 189*b* is exposed.

The antenna module 200 may be disposed on the first plate 111. The antenna module 200 may be mounted or seated on the antenna seating portion 114 formed on the first plate 111. The antenna module 200 may be disposed to face toward the first back cover 141 or the display 130. For example, the antenna module 200 may include an array antenna, and a surface on which the array antenna is formed may be disposed to face toward the first back cover 141 or the display 130. According to various embodiments of the disclosure, the antenna module 200 may radiate a radio frequency (RF) signal by forming a beam pattern in the rear direction (the −z-axis direction) or the front direction (e.g., the +z-axis direction) of the electronic device 100 using the array antenna. The array antenna of the antenna module 200 may include a patch antenna and/or a dipole antenna.

The antenna module 200 may be disposed between the hinge cover 155 and the first through-hole h1 when the electronic device 100 is viewed in a section perpendicular to the folding axis F. The antenna module 200 may be partially surrounded by the antenna seating portion 114. The illustrated embodiment is illustrative, and without being limited thereto, according to various embodiments of the disclosure, the antenna module 200 may be disposed on the first plate 111 instead of the second plate 121 or may be additionally disposed in another region of the first plate 111 and/or the second plate 121.

Figure 10:
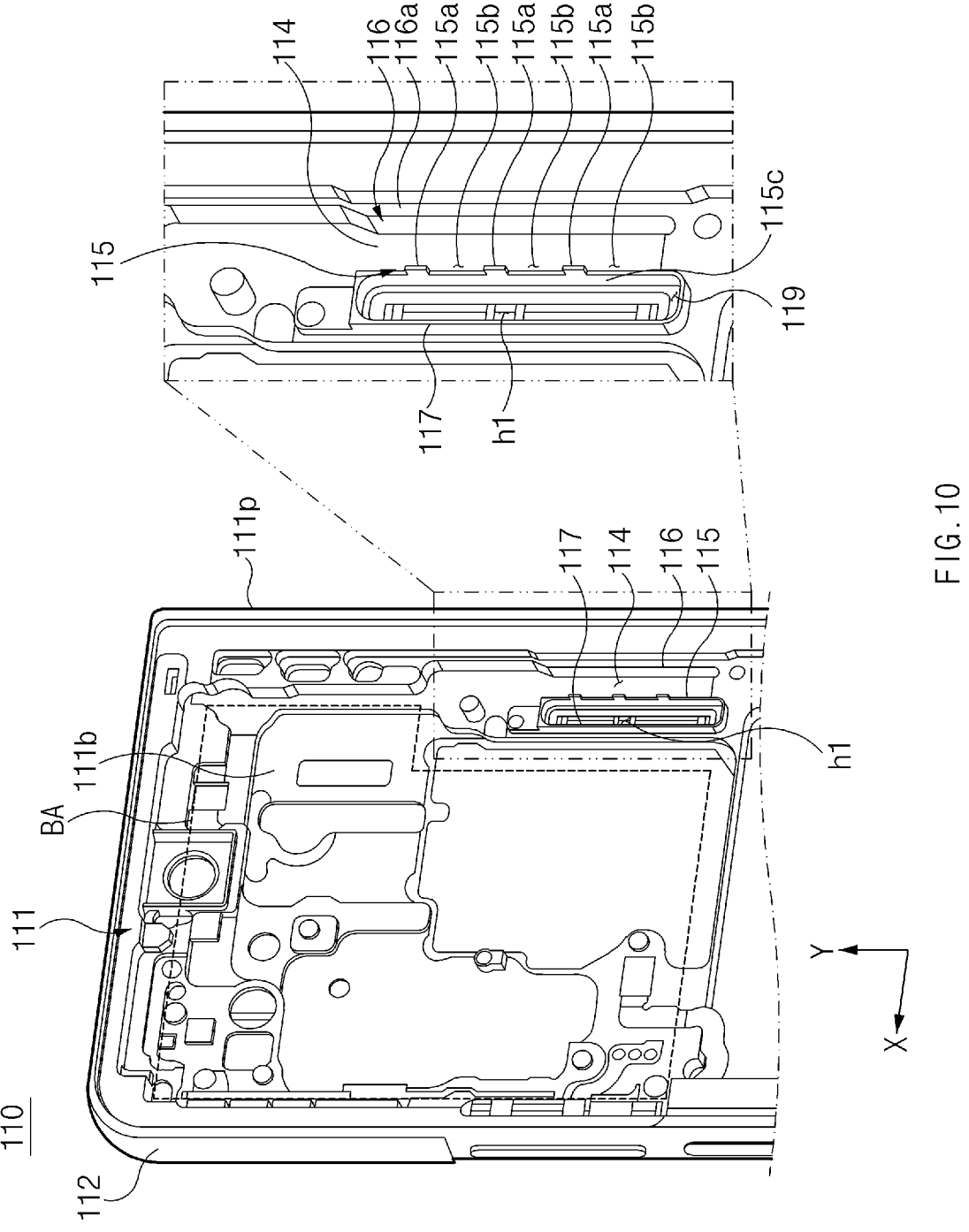
FIG. 10 is a view illustrating a first housing of an electronic device according to an embodiment of the disclosure.
Figure 11:
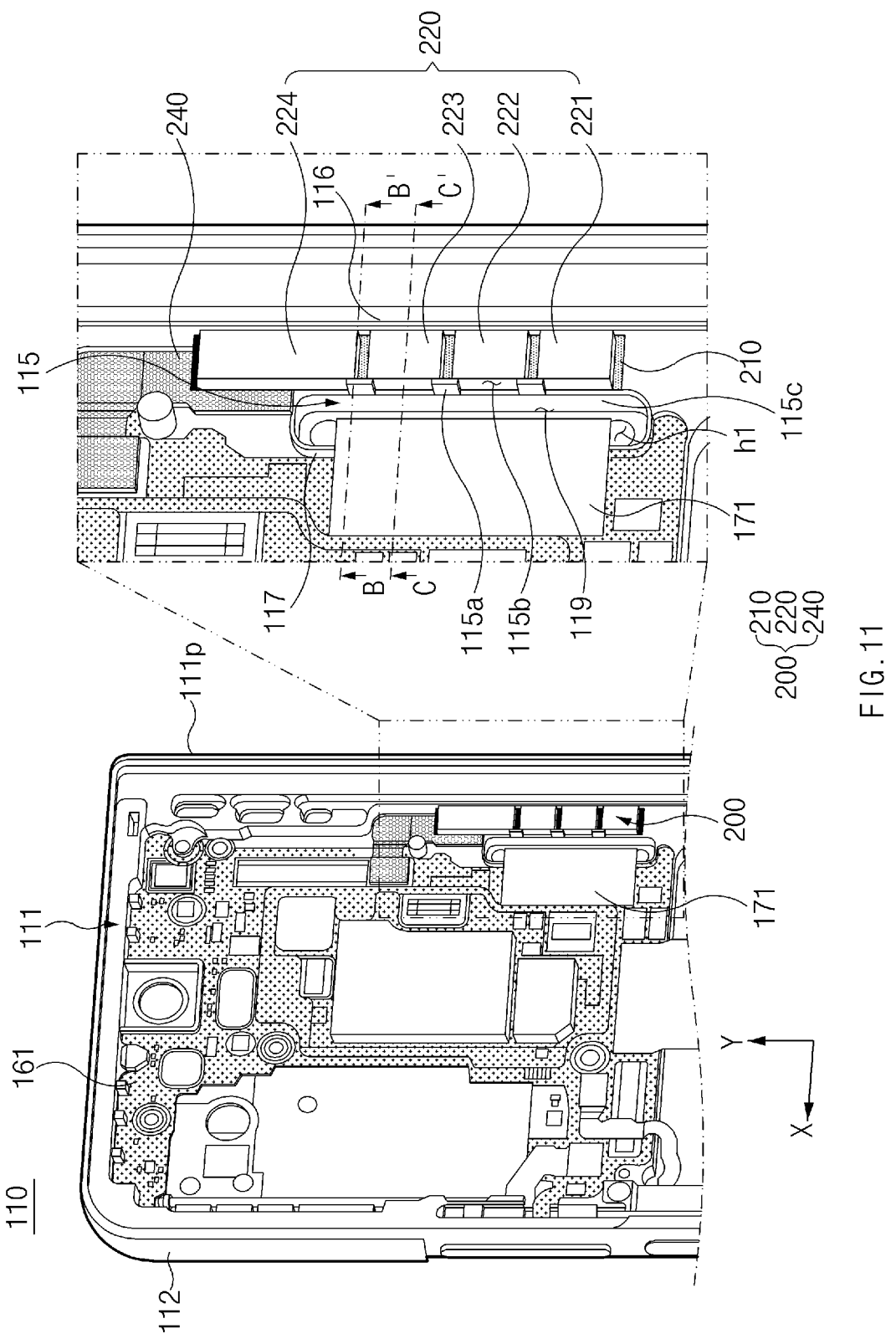
FIG. 11 is a view illustrating a first housing, a first circuit board, and an antenna module of an electronic device according to an embodiment of the disclosure.

FIG. 10 is a view illustrating a first housing of an electronic device according to an embodiment of the disclosure. FIG. 11 is a view illustrating a first housing, a first circuit board, and an antenna module of an electronic device according to an embodiment of the disclosure.

FIG. 10 is a perspective view of a first housing as viewed in a direction of a second surface of the first plate. FIG. 11 illustrates a state in which the first circuit board, the first connecting member, and the antenna module are disposed on the second surface of the first plate in FIG. 10.

Referring to FIGS. 10 and 11, the electronic device according to an embodiment (e.g., the electronic device 100 of FIGS. 1 to 4) may include the first housing 110, the first circuit board 161, the first connecting member 171, and the antenna module 200. The first circuit board 161 and the antenna module 200 may be disposed in the first housing 110. For example, the first housing 110 may include the first side member 112 and the first plate 111, and the first circuit board 161 and the antenna module 200 may be disposed (or, mounted) on the second surface 111b of the first plate 111 (e.g., the second surface 111b of FIGS. 5A and 5B).

The first through-hole h1 and the antenna seating portion 114 may be formed in a region of the second surface 111b of the first plate 111 that is adjacent to the first edge 111p. For example, a substrate region BA on which the first circuit board 161 is disposed may be formed on the second surface 111b, and the first through-hole h1 and the antenna seating portion 114 may be formed between the substrate region BA and the first edge 111p. The substrate region BA may be formed or defined in an upper region adjacent to the edge of the first plate 111 that faces in the +y-axis direction (or, the second side surface 112b of FIG. 1). The antenna seating portion 114 may be formed between the first through-hole h1 and the first edge 111p. Since the antenna seating portion 114 is located adjacent to the substrate region BA, the length of a connecting substrate 240 of the antenna module 200 electrically connected to the first circuit board 161 may be designed to be short. Accordingly, degradation in the performance of the antenna module 200 may be prevented or reduced.

The first plate 111 may include a first sidewall part 115 and a second sidewall part 116 that form the antenna seating portion 114. For example, the antenna seating portion 114 may be formed between the first sidewall part 115 and the second sidewall part 116. The antenna seating portion 114 may be defined as a receiving space that is concavely formed as the first sidewall part 115 and the second sidewall part 116 protrude (or, extend) from the second surface 111b of the first plate 111. The first sidewall part 115 and the second sidewall part 116 may surround at least a portion of the antenna module 200.

The first plate 111 may include a third sidewall part 117 that surrounds a region around the first through-hole h1 together with the first sidewall part 115. The first sidewall part 115 may be formed between the antenna seating portion 114 and the first through-hole h1, and the third sidewall part 117 may extend from the first sidewall part 115 to surround the first through-hole h1. The third sidewall part 117 may be connected with a base portion 115c of the first sidewall part 115. For example, the first sidewall part 115 and the third sidewall part 117 may be connected with each other to form a partition wall structure surrounding the first through-hole h1. For example, the first sidewall part 115 and the second sidewall part 116 may be integrally formed with each other. The first sidewall part 115 and the third sidewall part 117 may form a space 119 in which the first waterproof member 192 is accommodated or inserted. For example, the first waterproof member 192 may be inserted (e.g., refer to FIG. 13A or 13B) into the partition wall structure, which is formed by the first sidewall part 115 and the third sidewall part 117, so as to overlap the first through-hole h1. According to the illustrated embodiment of the disclosure, the third sidewall part 117 may have a lower height than the first sidewall part 115, but is not limited thereto.

The first connecting member 171 may pass through the first through-hole h1 and may extend from the second surface 111b of the first plate 111 to the first surface of the first plate 111 (e.g., the first surface 111a of FIGS. 5A and 5B). The first connecting member 171 may be connected to the first circuit board 161 and may extend into the first through-hole h1. Although not illustrated, a liquid waterproof member (e.g., the first waterproof member 192 of FIG. 7) having a predetermined viscosity may be accommodated in the space 119 inside the first sidewall part 115 and the third sidewall part 117. The waterproof member 192 may surround a portion of the first connecting member 171 passing through the first through-hole h1.

The antenna module 200 may include a base substrate 210, a plurality of radiating members 220, and the connecting substrate 240. The plurality of radiating members 220 may be disposed on one surface of the base substrate 210. Each of the radiating members 220 may include at least one antenna element (e.g., a plurality of antenna elements 261, 262, 263, 264, and 265 of FIG. 16). The connecting substrate 240 may extend from the base substrate 210 and may be connected to the first circuit board 161. For example, the connecting substrate 240 may electrically connect the base substrate 210 and the first circuit board 161.

The antenna module 200 may be disposed on the antenna seating portion 114 such that at least a portion overlaps the first sidewall part 115 and the second sidewall part 116. The antenna module 200 may be disposed between the first sidewall part 115 and the second sidewall part 116. For example, at least a portion of a side surface (e.g., a surface facing in the x-axis direction) of the antenna module 200 may face the first sidewall part 115 and the second sidewall part 116. The first sidewall part 115 and the second sidewall part 116 may be formed in a bumpy structure and/or a step structure so as to decrease an area overlapping the antenna module 200 or increase the distance from the antenna module 200. Accordingly, the performance of the antenna module 200 may be secured.

At least a portion of the first sidewall part 115 of the first plate 111 may be formed in an open form, and thus the first sidewall part 115 may be formed so as not to hide some of the plurality of radiating members 220 based on a first direction (e.g., the −x-axis direction). For example, the first direction may be defined as a direction parallel to the base substrate 210 of the antenna module 200 and perpendicular to the first edge 111p. The first sidewall part 115 of the first plate 111 may include the base portion 115c and a plurality of protrusions 115a extending from the base portion 115c in a direction perpendicular to the second surface 111b (e.g., the direction toward the first back cover 141 of FIGS. 4 and 7 or the −z-axis direction). The plurality of protrusions 115a may extend so as to be spaced apart from each other by a specified gap, and a plurality of recesses 115b may be defined between the plurality of protrusions 115a. For example, the plurality of protrusions 115*a* may be spaced apart from each other by a predetermined gap in the direction of the first edge 111*p* of the first plate 111, and the plurality of recesses 115*b* may be defined as open regions (or, depressed regions) formed by the plurality of protrusions 115*a*. The recesses 115*b* may be formed or defined between the protrusions 115*a* adjacent to each other. Accordingly, the plurality of protrusions 115*a* and the plurality of recesses 115*b* may be alternately formed and/or disposed in a direction (e.g., the y-axis direction) parallel to the first edge 111*p*.

The protrusions 115*a* may support (e.g., refer to FIG. 13A or 13B) the rear case (e.g., the rear case 194 of FIG. 12 and FIG. 13A or 13B) disposed on the second surface 111*b* to cover the antenna module 200 and at least a portion of the first circuit board. The protrusions 115*a* may overlap gaps G between the plurality of radiating members 220. For example, the plurality of radiating members 220 may be spaced apart from each other, and the gaps G (e.g., gaps G of FIG. 15) may be formed between the plurality of radiating members 220. The protrusions 115*a* may overlap (or, may be aligned with) the gaps G based on the first direction ①.

The recesses 115*b* may face the radiating members 220 of the antenna module 200. For example, since the protrusions 115*a* are formed in the positions overlapping the gaps G between the plurality of radiating members 220 based on the first direction (e.g., the −x-axis direction), the recesses 115*b* defined (or, formed) between the adjacent protrusions 115*a* may overlap at least a part of the radiating members 220. The area by which the first sidewall part 115 overlaps the radiating members 220 (or, the antenna elements) based on the first direction may be reduced by the recesses 115*b*. Without being limited to the embodiment illustrated in FIGS. 10 and 11, the protrusions 115*a* and the recesses 115*b* of the first sidewall part 115 may be diversely changed to correspond to the structure or shape of the antenna module 200. According to various embodiments of the disclosure, the first sidewall part 115 may be modified into a form in which only the first protrusion 115*a* and the third protrusion 115*a* among the illustrated protrusions 115*a* are included, the second protrusion 115*a* is omitted, and a recess is formed between the first protrusion 115*a* and the third protrusion 115*a*.

A step portion 116*a* may be formed on the second sidewall part 116 of the first plate 111. For example, the second sidewall part 116 may be formed such that one portion disposed above the step portion 116*a* is farther away from the antenna module 200 than another portion disposed below the step portion 116*a*. The distance by which the second sidewall part 116 is spaced apart from the radiating members 220 or the antenna elements may be increased by the step portion 116*a*.

Figure 12:
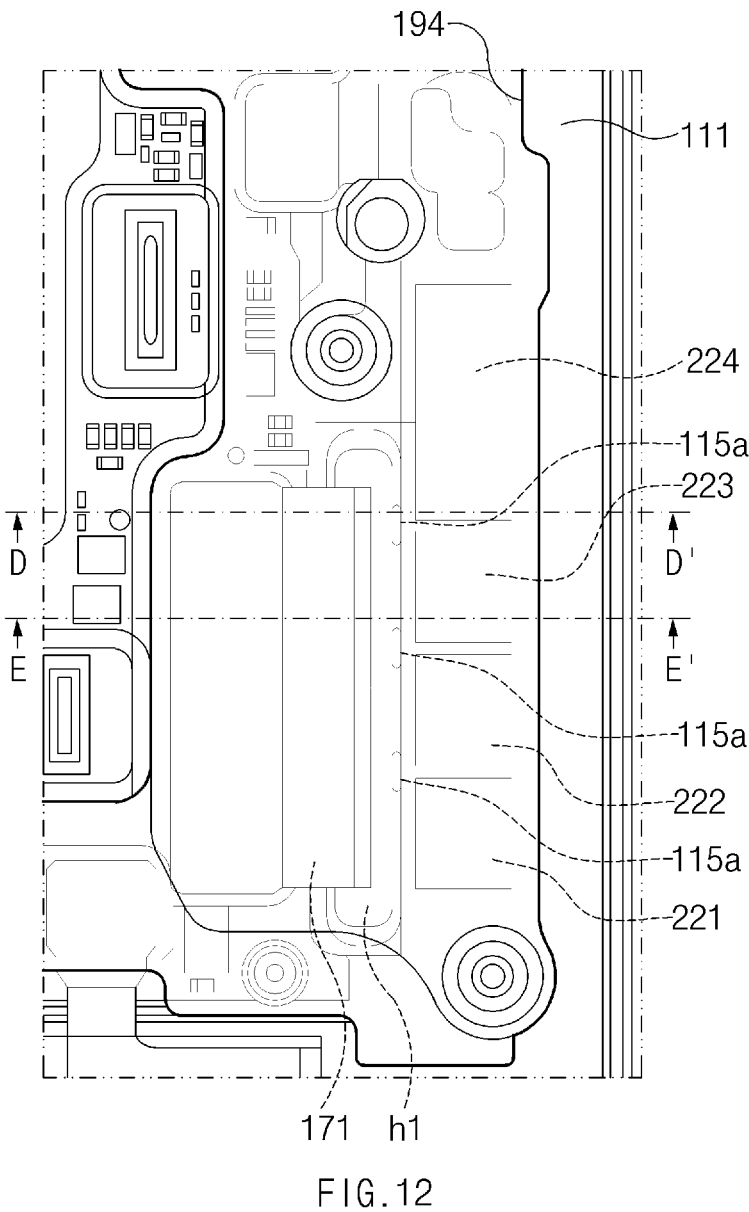
FIG. 12 is a view illustrating a first housing and a rear case of an electronic device according to an embodiment of the disclosure.
Figure 13A:
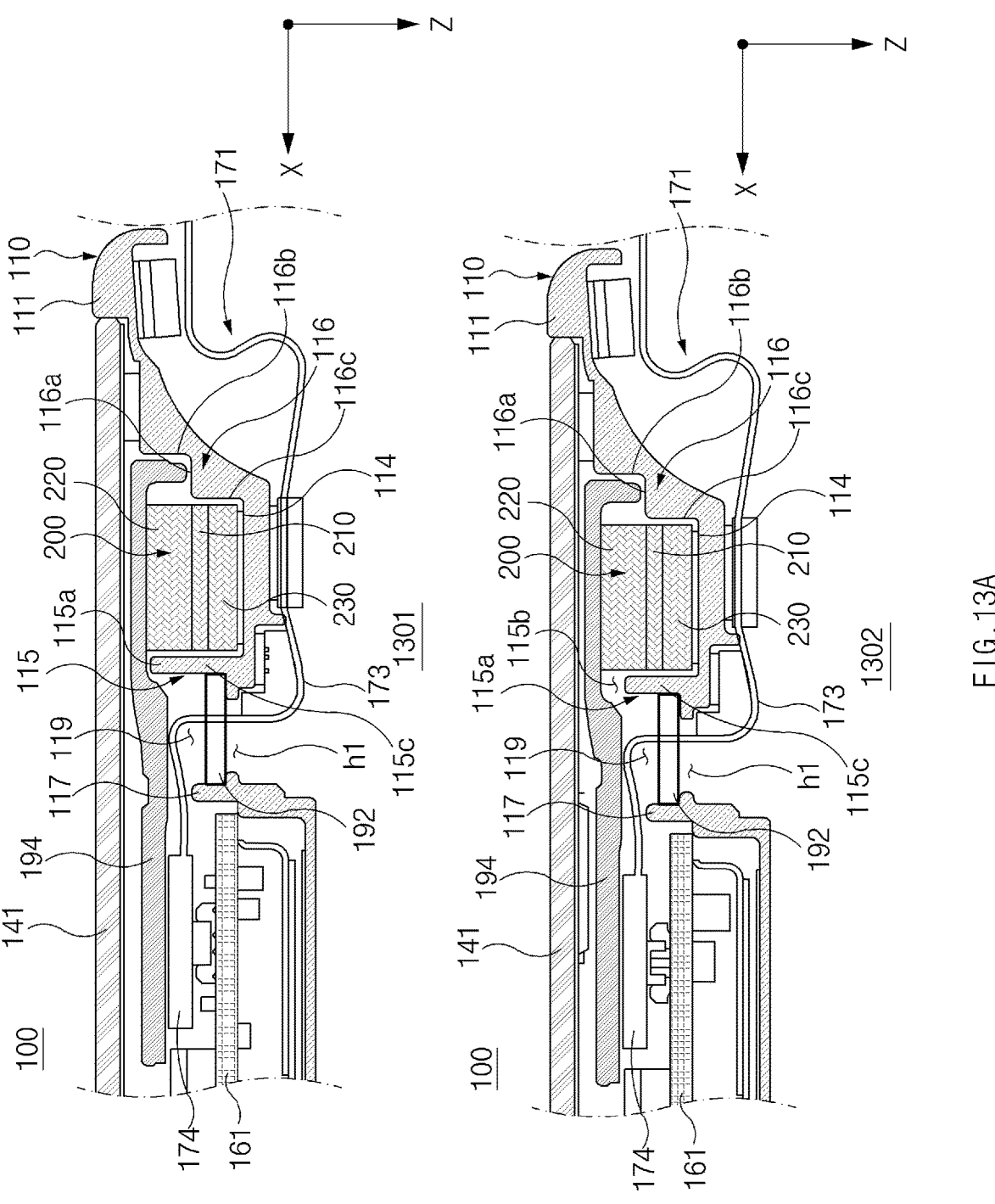
FIG. 13A is a sectional view of a portion of an electronic device according to an embodiment of the disclosure.
Figure 13B:
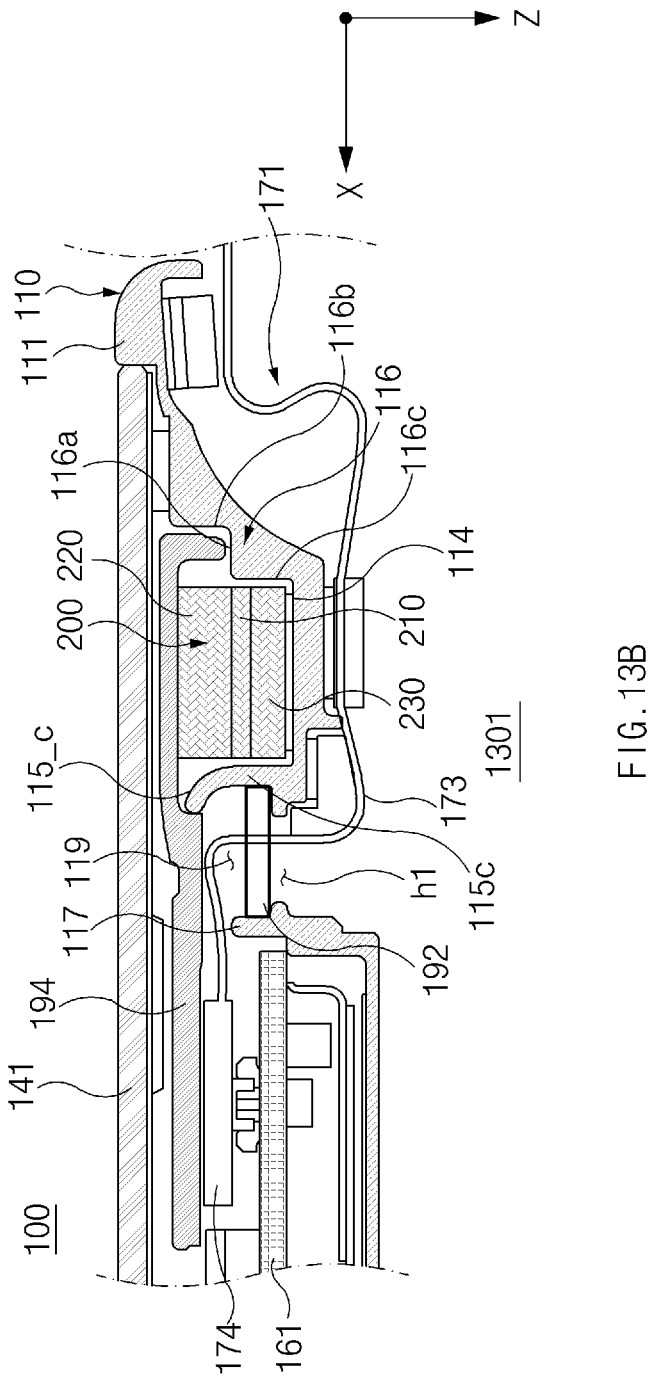
FIG. 13B is another form of a sectional view of a portion of an electronic device according to an embodiment of the disclosure.

FIG. 12 is a view illustrating a first housing and a rear case of an electronic device according to an embodiment of the disclosure. FIG. 13A is a sectional view of a portion of an electronic device according to an embodiment of the disclosure. FIG. 13B is another form of a sectional view of a portion of an electronic device according to an embodiment of the disclosure.

1301 of FIG. 13A is a sectional view of the electronic device corresponding to direction B-B' illustrated in FIG. 11 and direction D-D' illustrated in FIGS. 12, and 1302 of FIG. 13A is a sectional view of the electronic device corresponding to direction C-C' illustrated in FIG. 11 and direction E-E' illustrated in FIG. 12. FIG. 13B illustrates a modified shape of the first sidewall part according to an embodiment of the disclosure.

Referring to FIGS. 11, 12, and 13A, the electronic device 100 according to an embodiment may include the first housing 110, the first back cover 141, the first circuit board 161, the first connecting member 171, the rear case 194, and the antenna module 200.

The rear case 194 may be disposed between the first back cover 141 and the first plate 111. For example, the rear case 194 may be referred to as one portion of an upper end of the first support member 181 illustrated in FIG. 4 (e.g., a portion of the first support member 181 of FIG. 4 in the +y-axis direction). The rear case 194 may overlap the antenna module 200 and the first connector 174. For example, the rear case 194 may be disposed on the first plate 111 to cover the antenna module 200 and the first connector 174. The rear case 194 may cover the first connector 174 and the antenna module 200 to prevent separation of the first connector 174 from the first circuit board 161 or separation of the antenna module 200 from the antenna seating portion 114. The rear case 194 may be formed of a moldable material so as not to affect the function or performance of the antenna module 200, but is not limited thereto. The rear case 194 may be supported by the protrusions 115*a* of the first sidewall part 115.

The antenna module 200 may include the base substrate 210, the plurality of radiating members 220 disposed on one surface (e.g., a surface facing in the −z-axis direction) of the base substrate 210, and a shielding member 230 disposed on an opposite surface (e.g., a surface facing in the +z-axis direction) of the base substrate 210. Each of the plurality of radiating members 220 may include antenna elements (e.g., the plurality of antenna elements 261, 262, 263, 264, and 265 of FIG. 16). The antenna module 200 may be disposed on the antenna seating portion 114 through an adhesive member disposed between the shielding member 230 and the antenna seating portion 114, but is not limited thereto.

The antenna module 200 may be disposed to face toward the first back cover 141. For example, the antenna module 200 may be disposed such that the surface on which the plurality of antenna elements is formed faces toward the first back cover 141. The antenna module 200 may radiate an RF signal by forming a beam pattern in the rear direction of the electronic device 100 (e.g., the −z-axis direction) or the direction toward the first back cover 141 using the plurality of antenna elements. For example, a directional beam formed by the antenna module 200 may mainly face toward the first back cover 141. However, the directional beam may partially face in the front direction (e.g., the +z-axis direction) and the lateral directions (e.g., the −x/+x-axis directions) of the electronic device 100. The direction in which the antenna module 200 faces is not limited to the illustrated embodiment.

The first sidewall part 115 and the second sidewall part 116 may be disposed on opposite sides of the antenna seating portion 114. The antenna module 200 may be disposed such that opposite sides in the width direction (e.g., the x-axis direction) face the first sidewall part 115 and the second sidewall part 116. For example, the antenna seating portion 114 may be formed or defined by the space between the first sidewall part 115 and the second sidewall part 116.

The first sidewall part 115 may include the plurality of protrusions 115*a* spaced apart from each other. The protrusions 115*a* may protrude from the base portion 115*c* toward the rear case 194 (or, toward the first back cover 141) by a predetermined height to support the rear case 194. For example, the protrusions 115*a* may make contact with a portion of the rear case 194 to support the rear case 194 such that the rear case 194 does not sag downward (e.g., the direction toward the first circuit board 161 or the +z-axis direction). The protrusions 115a may be located at substantially the same height as the radiating members 220 of the antenna module 200.

Since the plurality of protrusions 115a protrude from the base portion 115c of the first sidewall part 115, the recesses 115b, which are relatively depressed regions (or, concave regions), may be defined or formed on the first sidewall part 115. The recesses 115b may overlap the radiating members 220. At least portions of sides of the radiating members 220 in the width direction (e.g., the x-axis direction) may be exposed by the recesses 115b without overlapping the first sidewall part 115. For example, referring to FIGS. 11 and 13 together, when the first sidewall part 115 is viewed from one side of the first sidewall part 115 in the +x-axis direction, most of the radiating members 220 may be exposed through the recesses 115b without being hidden by the first sidewall part 115. According to an embodiment of the disclosure, the area by which the radiating members 220 overlap or face the first sidewall part 115 made of a metallic material based on a direction parallel to the base substrate 210 may be minimized through the recesses 115b, and thus the performance of the antenna module 200 may be improved.

The second sidewall part 116 may include the step portion 116a. The second sidewall part 116 may include a first portion 116b and a second portion 116c connected in a stepped manner by the step portion 116a. The first portion 116b may extend from the step portion 116a toward the first back cover 141, and the second portion 116c may extend from the step portion 116a in a direction opposite to the extension direction of the first portion 116b. The distance between the first portion 116b and the antenna module 200 may be greater than the distance between the second portion 116c and the antenna module 200. According to an embodiment of the disclosure, the separation distance between the radiating members 220 and the second sidewall part 116 may be increased through the step portion 116a, and thus the performance of the antenna module 200 may be improved.

The first sidewall part 115 and the third sidewall part 117 may extend to surround the region around the first through-hole h1. For example, the liquid waterproof member 192 having viscosity (e.g., the first waterproof member 192 of FIG. 7) may be accommodated in the space between the base portion 115c of the first sidewall part 115 and the third sidewall part 117. The first sidewall part 115 and the third sidewall part 117 may protrude to a predetermined height and thus may prevent the waterproof member 192 from overflowing toward the antenna module 200 and/or the first circuit board 161.

Referring to FIG. 13B, the electronic device 100 according to an embodiment may include the first housing 110, the first back cover 141, the first circuit board 161, the first connecting member 171, the rear case 194, and the antenna module 200. Except for the first sidewall part of the first housing 110 among the aforementioned components of the electronic device 100 illustrated in FIG. 13B, the first back cover 141, the first circuit board 161, the first connecting member 171, the rear case 194, and the antenna module 200 may include components that are the same as, or similar to, the components of the first back cover 141, the first circuit board 161, the first connecting member 171, the rear case 194, and the antenna module 200 described above with reference to FIG. 13A.

The first housing 110 may include a first modified sidewall part 115_c. The first modified sidewall part 115_c may include a shape in which a plurality of protrusions 115a spaced apart from each other are curved in the x-axis direction. At least a portion of the first modified sidewall part 115_c (e.g., an upper end of the first modified sidewall part 115_c (an end facing in the −z-axis direction or at least a portion including the end)) may be spaced apart from the radiating members 220 of the antenna module 200 by a predefined distance or more, and thus the radiation efficiency of the antenna module 200 may be improved. As described above, the upper end of the first modified sidewall part 115_c may be spaced apart from the radiating members 220 by the predetermined distance or more to improve the antenna performance of the radiating members 220 while a lower end of the first modified sidewall part 115_c (e.g., an end facing in the z-axis direction or at least a portion including the end) is brought into close contact with the antenna module 200 to improve movement of the base substrate 210 or fix the base substrate 210. Additionally or alternatively, the first modified sidewall part 115_c may be inclined (or, curved) in the x-axis direction (or, a direction to surround the waterproof member 192 or a direction toward the first through-hole h1) to guide the first connecting member 171 such that the first connecting member 171 is well inserted in the direction toward the first back cover 141 and to protect the inserted first connecting member 171. According to an embodiment, the first modified sidewall part 115_c formed to be inclined (or, bent or curved) in the x-axis direction may serve to prevent a liquid material of the waterproof member 192 from overflowing toward the antenna module 200 in a process in which the waterproof member 192 is formed to close the first through-hole h1. The first modified sidewall part 115_c may be formed to support the rear case 194.

The above-described first modified sidewall part 115_c may include a form in which the protrusions 115a described above with reference to FIG. 13A are modified. Alternatively, a structure that does not form the separate protrusions 115a and the separate recesses 115b (e.g., a sidewall part having the height of the protrusions 115a) may be curved (or, inclined) in the x-axis direction to form the first modified sidewall part 115_c. At least a portion of a corner of the first modified sidewall part 115_c (e.g., an upper end protruding in a diagonal direction between the x-axis and the −z-axis) may be rounded. Even though a collision occurs in a process in which the first connecting member 171 is disposed, the rounded corner of the first modified sidewall part 115_c may prevent damage to the first connecting member 171, or may reduce (or, improve) a possibility of damage to the first connecting member 171.

Figure 14:
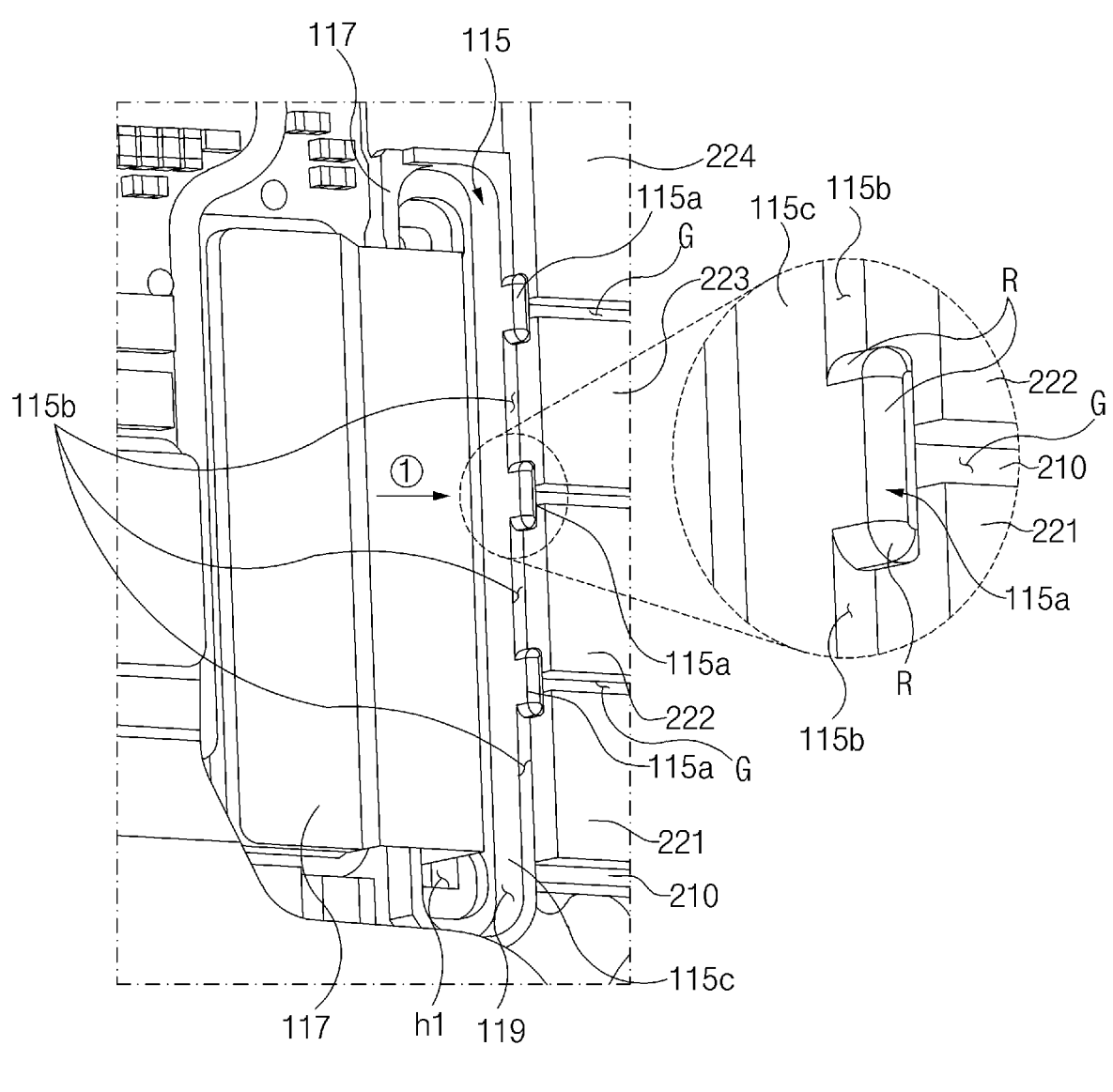
FIG. 14 illustrates one portion of an electronic device where a first through-hole and a first connecting member are disposed according to an embodiment of the disclosure.

FIG. 14 illustrates one portion of an electronic device where a first through-hole and a first connecting member are disposed according to an embodiment of the disclosure.

FIG. 14 illustrates one portion of an electronic device that corresponds to an enlarged view illustrated in FIG. 11.

Referring to FIG. 14, the electronic device 100 according to an embodiment may include the first housing 110 and the antenna module 200 disposed on the first plate 111 of the first housing 110. The antenna module 200 may include the base substrate 210 and the plurality of radiating members 220.

The first plate 111 may include the first sidewall part 115 and the third sidewall part 117 that surround the first through-hole h1 and form the space 119 in which the waterproof member (e.g., the first waterproof member 192 of FIGS. 7 and 13) is disposed.

The first sidewall part 115 may include the bumpy structure 115a and 115b. The bumpy structure 115a and 115b may include the plurality of protrusions 115a spaced apart from each other. The plurality of recesses 115b, which are relatively depressed regions, may be defined on the opposite sides of the plurality of protrusions 115a. For example, the plurality of protrusions 115a may be located between the plurality of recesses 115a adjacent to each other. The plurality of protrusions 115a and the plurality of recesses 115b may be sequentially disposed to form the bumpy structure 115a and 115b of the first sidewall part 115. At least portions of the plurality of protrusions 115a may overlap, or may be aligned with, the gaps G between the plurality of radiating members 220 of the antenna module 200 based on the first direction ①. For example, based on the first direction ① (or, when viewed in the first direction ①, central portions of the protrusions 115a may overlap the gaps G, and opposite end portions of the protrusions 115a may overlap portions of the plurality of radiating members 220 adjacent to each other. Based on the first direction ①, the plurality of recesses 115b may overlap, or may be aligned with, at least portions of the plurality of radiating members 220. For example, based on the first direction ① (or, when viewed in the first direction ①), most of the plurality of radiating members 220 may be exposed between the protrusions 115a that overlap the recesses 115b and are adjacent to each other.

The first sidewall part 115 may face at least a portion of the first connecting member 171 extending toward the first through-hole h1. The first connecting member 171 may extend from the first circuit board 161 and may be bent toward the first through-hole h1 so as to pass through the first through-hole h1. The bent portion of the first connecting member 171 may face the first sidewall part 115.

The first connecting member 171 may have rounded corner portions to prevent breakage and/or damage of the first connecting member 171 when the first connecting member 171 is brought into contact with the protrusions 115a of the first sidewall part 115. For example, corner portions of the protrusions 115a facing toward the first connecting member 171 may be formed to be curved surfaces R having a predetermined curvature.

In another example, at least one protrusion among the plurality of protrusions 115a of the first sidewall part 115 may protrude into the gap G formed between the plurality of radiating members 220. Accordingly, when viewed in the direction toward the display 130, at least a portion of the at least one protrusion 115a may be disposed in the gap G formed between the plurality of radiating members 220. The length of the portion of the protrusion 115a that enters the gap G may be less than or equal to half of the length of the radiating members 220 in consideration of antenna radiation performance.

Figure 15:
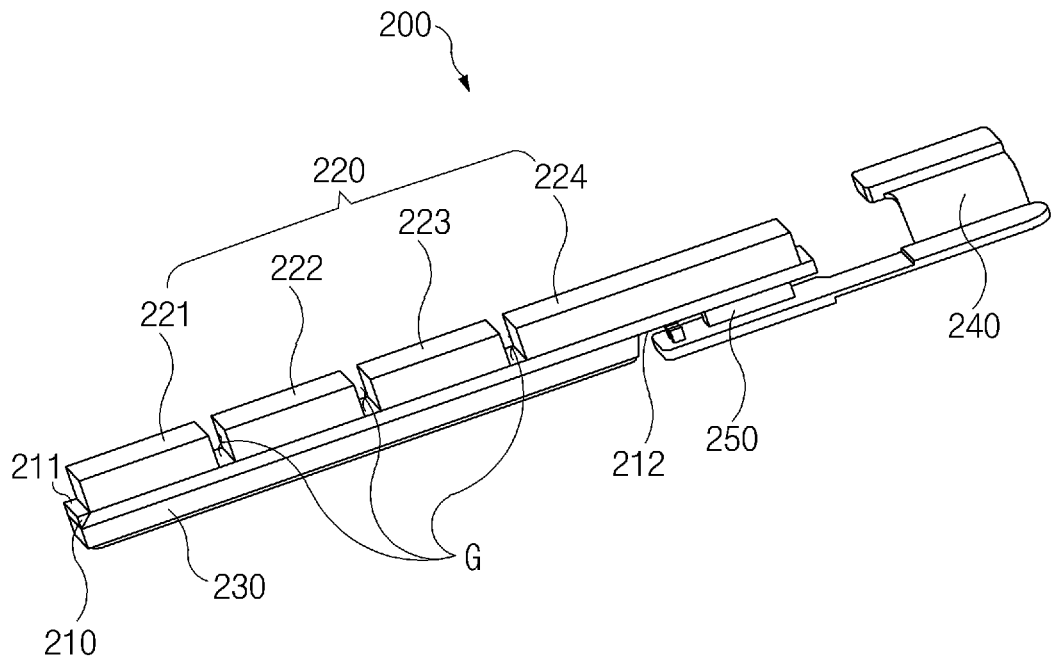
FIG. 15 is a view illustrating an antenna module of an electronic device according to an embodiment of the disclosure.
Figure 16:
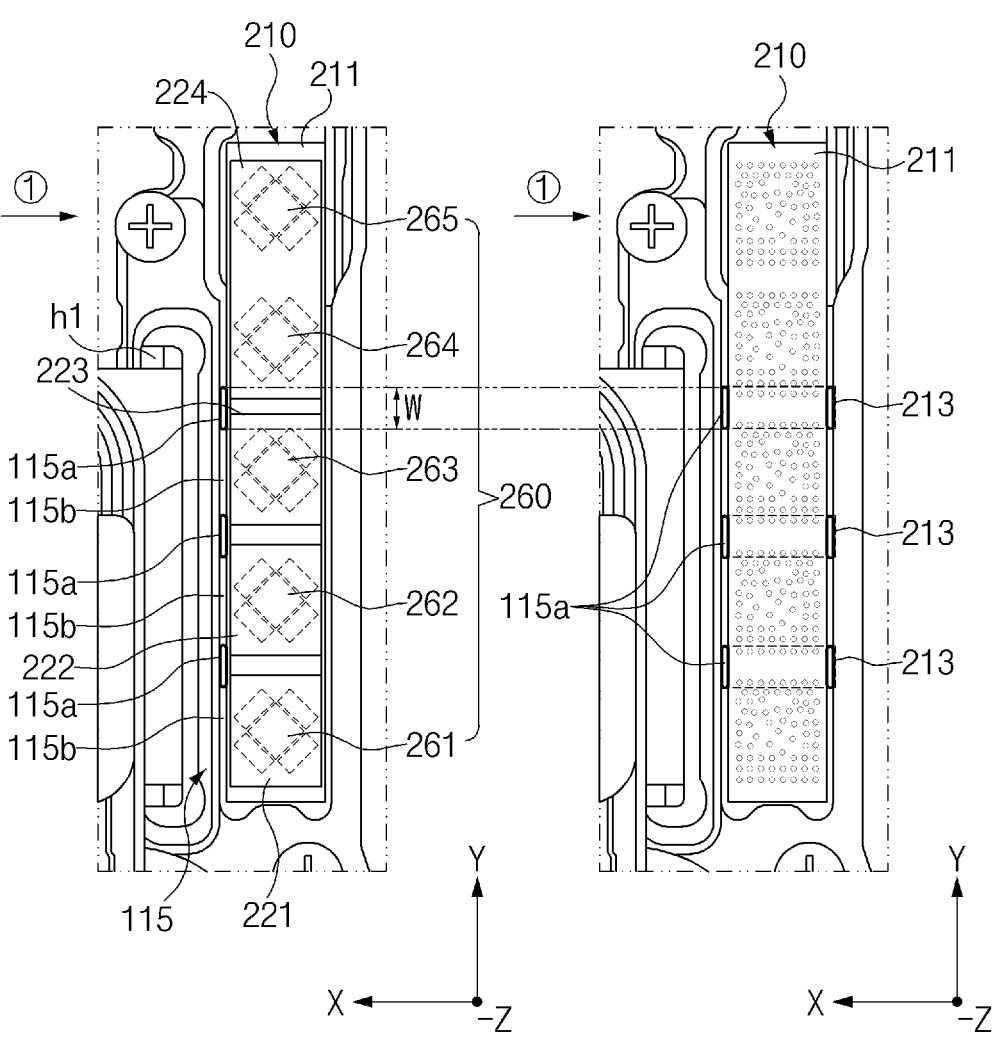
FIG. 16 is a view illustrating an arrangement structure of an antenna module of an electronic device according to an embodiment of the disclosure.

FIG. 15 is a view illustrating an antenna module of an electronic device according to an embodiment of the disclosure. FIG. 16 is a view illustrating an arrangement structure of an antenna module of an electronic device according to an embodiment of the disclosure.

Referring to FIGS. 15 and 16, the antenna module 200 of the electronic device according to an embodiment (e.g., the electronic device 100 of FIGS. 1 to 4) may include the base substrate 210, the plurality of radiating members 220, the shielding member 230, the connecting substrate 240, and an antenna connector 250. For example, the antenna module may be a high-frequency (e.g., mmWave) antenna module.

The base substrate 210 may include a plurality of conductive layers and a plurality of non-conductive layers alternately stacked one above another. The base substrate 210 may provide electrical connection between various components disposed inside and/or outside the base substrate 210 using lines and conductive VIAs formed in the conductive layers.

The plurality of radiating members 220 may be disposed on a first surface 211 of the base substrate 210. The plurality of radiating members 220 may include a first radiating member 221, a second radiating member 222, a third radiating member 223, and a fourth radiating member 224 spaced apart from each other. The predetermined gaps G may be formed between the plurality of radiating members 220 adjacent to each other. Each of the plurality of radiating members 220 may include at least one antenna element 261, 262, 263, 264, and 265. For example, each of the plurality of radiating members 220 may include a substrate including a plurality of layers and the antenna elements 261, 262, 263, 264, and 265 formed in at least a part of the plurality of layers of the substrate. The illustrated embodiment is illustrative, and without being limited thereto, the plurality of radiating members 220 may be integrally formed without being spaced apart from each other.

The antenna module 200 may include an antenna array that forms a directional beam. The antenna array may include the plurality of antenna elements 261, 262, 263, 264, and 265 formed or disposed on the plurality of radiating members 220. For example, the antenna module 200 may include a patch antenna array 260. The first radiating member 221 may include the first patch antenna element 261. The second radiating member 222 may include the second patch antenna element 262. The third radiating member 223 may include the third patch antenna element 263. The fourth radiating member 224 may include the fourth patch antenna element 264 and the fifth patch antenna element 265. The patch antenna array 260 may include the plurality of patch antenna elements 261, 262, 263, 264, and 265 of the plurality of radiating members 220. Although not illustrated, according to various embodiments of the disclosure, the antenna module 200 may include a dipole antenna array.

The shielding member 230 may be disposed on a second surface 212 (e.g., a surface facing away from the first surface 211) of the base substrate 210. A radio frequency integrated circuit (RFIC) and/or a power manage integrate circuit (PMIC) may be disposed on the second surface 211 of the base substrate 210. The shielding member 230 may be disposed on the second surface 212 of the base substrate 210 to electromagnetically shield the RFIC and/or the PMIC. In an embodiment of the disclosure, the shielding member 602 may include a shield can and/or an epoxy molding compound.

The RFIC and the PMIC may be disposed on the second surface 212 facing away from the first surface 211 of the base substrate 210 so as to face away from the plurality of radiating members 220. The RFIC may process signals in a selected frequency band that is transmitted and received through the antenna array. For example, during transmission, the RFIC may up-convert an IF signal obtained from an intermediate frequency integrate circuit (IFIC) to convert the IF signal into an RF signal in a specified band. For example, during reception, the RFIC may down-convert an RF signal received through the antenna array to convert the RF signal into an IF signal and may transfer the IF signal to the IFIC. The PMIC may receive voltage from a main PCB (e.g., the first circuit board 161 of FIG. 4) and may provide power required for various parts (e.g., the RFIC) on the antenna module 200.

The antenna module 200 may be electrically connected with the first circuit board 161 through the connector 250 and the connecting substrate 240. The connector 250 may be disposed on the second surface 212 of the base substrate 210 on which the shielding member 230 is disposed. The connecting substrate 240 may be electrically connected, at opposite ends thereof, to the connector 250 and the first circuit board 161 and may electrically connect the antenna module 200 (e.g., the RFIC and the PMIC) to the first circuit board 161. For example, the connecting substrate 240 may include a flexible printed circuit board FPCB. The connector 250 and the connecting substrate 240 may transfer, between the first circuit board 161 (e.g., a communication circuit) and the base substrate 210, signals or data related to operations of the plurality of antenna elements 261, 262, 263, 264, and 265 included in the antenna module 200 and thus may support signal transmission and reception of the antenna module 200 in a specified frequency band (e.g., a frequency band between 3 GHz and 100 GHz).

Hereinafter, a relationship between the bumpy structure 115a and 115b of the first sidewall part 115 and the antenna module 200 will be described with reference to FIG. 14 together. The bumpy structure 115a and 115b may include the plurality of protrusions 115a. As the plurality of protrusions 115a relatively protrude from the base portion 115c, the plurality of recesses 115b may be defined on the opposite sides of the plurality of protrusions 115a in the direction of the width w. For example, the widths w of the plurality of protrusions 115a may be lengths measured in a direction (e.g., the y-axis direction) parallel to the direction in which the plurality of radiating members 220 (or, the plurality of antenna elements 261, 262, 263, 264, and 265) of the antenna module 200 are arranged.

The protrusions 115a of the bumpy structure 115a and 115b may be formed in positions not overlapping the plurality of antenna elements 261, 262, 263, 264, and 265 included in the plurality of radiating members 220. For example, based on the first direction ①, the protrusions 115a may not overlap the plurality of antenna elements 261, 262, 263, 264, and 265, but may overlap regions (e.g., ground VIA regions 213) between the plurality of antenna elements 261, 262, 263, 264, and 265. For example, when the first surface 211 of the base substrate 210 is viewed from above, the plurality of protrusions 115a may be aligned with the region between the first antenna element 261 and the second antenna element 262, the region between the second antenna element 262 and the third antenna element 263, and the region between the third antenna element 263 and the fourth antenna element 264, respectively, in the first direction ①. The protrusions 115a may overlap some of the plurality of radiating members 220 and the gaps G between the plurality of radiating members 220, and portions of the plurality of radiating members 220 overlapping the protrusions 115a may be portions or regions in which the plurality of antenna elements 261, 262, 263, 264, and 265 are not located.

As the protrusions 115a are formed so as not to overlap the plurality of antenna elements 261, 262, 263, 264, and 265, the recesses 115b of the bumpy structure 115a and 115b may overlap the plurality of antenna elements 261, 262, 263, 264, and 265. For example, based on the first direction, the recesses 115b may overlap the plurality of antenna elements 261, 262, 263, 264, and 265. When the first surface 211 of the base substrate 210 is viewed from above, the recesses 115b may overlap the plurality of antenna elements 261, 262, 263, 264, and 265 in the first direction ①. The first direction ① may be defined as a direction parallel to the base substrate 210 and perpendicular to the direction in which the plurality of antenna elements 261, 262, 263, 264, and 265 are arranged. For example, when the first sidewall part 115 is viewed in the first direction ①, portions of the plurality of radiating members 220 that overlap the recesses 115b (or, are exposed through the recesses 115b) may be portions or regions in which the plurality of antenna elements 261, 262, 263, 264, and 265 are disposed. According to embodiments of the disclosure, the performance of the antenna module 200 may be improved by reducing the area by which the plurality of antenna elements 261, 262, 263, 264, and 265 and the first plate 111 made of a metallic material (e.g., the first sidewall part 115) overlap or face each other.

The base substrate 210 may have a plurality of VIAs formed therein. Antenna element VIA regions including VIAs overlapping the plurality of antenna elements 261, 262, 263, 264, and 265 and the ground VIA regions 213 disposed between the antenna element VIA regions may be formed or defined in the base substrate 210. To stably support the rear case 194, the protrusions 115a may have a maximum width w (e.g., a length in the y-axis direction) within a range that does not overlap the antenna elements 261, 262, 263, 264, and 265 (or, the element VIA regions). The protrusions 115a may overlap, or may be aligned with, the ground VIA regions 213 based on the first direction ①. For example, the width w of the protrusions 115a may be substantially the same as the width of the ground VIA regions 213. However, the disclosure is not limited thereto. In the illustrated embodiment of the disclosure, VIAs included in the ground VIA regions 213 may overlap the plurality of radiating members 220 based on a direction perpendicular to the first surface 211 of the base substrate 210. However, the disclosure is not limited thereto.

The radiation performance of the antenna module 200 according to an embodiment in which the bumpy structure 115a and 115b is formed on the first sidewall part 115 facing the antenna module 200 and a comparative example in which the bumpy structure 115a and 115b is not formed may be represented as shown in Table 1 below.

TABLE 1

|  |  | Comparative Example | Embodiment | Degree of Improvement |
|---|---|---|---|---|
| n261 | CDF 50% | 19.2 | 20.1 | 0.9 |
| LOW | Peak EIRP | 28.2 | 29.9 | 1.7 |
| n261 | CDF 50% | 19.2 | 20.7 | 1.5 |
| MID | Peak EIRP | 27.6 | 28.4 | 0.8 |
| n261 | CDF 50% | 19.3 | 20 | 0.7 |
| HIGH | Peak EIRP | 27.3 | 27.5 | 0.2 |
| n260 | CDF 20% | 9.2 | 9.5 | 0.3 |
| LOW | CDF 50% | 17 | 17.6 | 0.6 |
|  | Peak EIRP | 26.3 | 27.1 | 0.8 |
| n260 | CDF 20% | 8.1 | 8.9 | 0.8 |
| MID | CDF 50% | 17.1 | 17.3 | 0.2 |
|  | Peak EIRP | 26.6 | 26.8 | 0.2 |
| n260 | CDF 20% | 8.1 | 8.8 | 0.7 |
| HIGH | CDF 50% | 17 | 18.4 | 1.4 |
|  | Peak EIRP | 25.5 | 27.5 | 2 |

Table 1 above shows cumulative distribution function (CDF) characteristics of the antenna module 200 based on the n261 band and the n260 band in the embodiment in which the bumpy structure 115a and 115b are formed and the comparative example in which the bumpy structure 115a and 115b does not exist. Referring to Table 1 above, it can be seen that based on the n261 band, the gain in the CDF 50% section in the embodiment is improved when compared to the gain in the CDF 50% section in the comparative example. In addition, it can be seen that based on the n260 band, the gains in the CDF 20% section and the CDF 50% section in the embodiment are improved when compared to the gains in the CDF 20% section and the CDF 50% section in the comparative example. This may mean that the performance of the antenna module 200 is improved by reducing the area of the first sidewall part 115 overlapping the antenna module 200 through the bumpy structure 115a and 115b.

The structure and/or shape of the antenna module 200 is not limited to the embodiment illustrated in FIGS. 15 and 16. For example, the antenna module 200 may not be constituted by the plurality of radiating members 220 spaced apart from each other, and the plurality of antenna elements 261, 262, 263, 264, and 265 may be formed on one surface of one substrate stacked on the base substrate 210 or inside the one substrate, or may be formed on the first surface 211 of the base substrate 210 or inside the base substrate 210. The bumpy structure 115a and 115b of the first sidewall part 115 may be modified to correspond to the structure and/or shape of the antenna module 200. For example, the bumpy structure 115a and 115b may be diversely modified within a range in which the protrusions 115a do not overlap at least some of the plurality of antenna elements 261, 262, 263, 264, and 265 based on the direction (e.g., the first direction ①)) in which the first sidewall part 115 and the antenna module 200 face each other.

Figure 17:
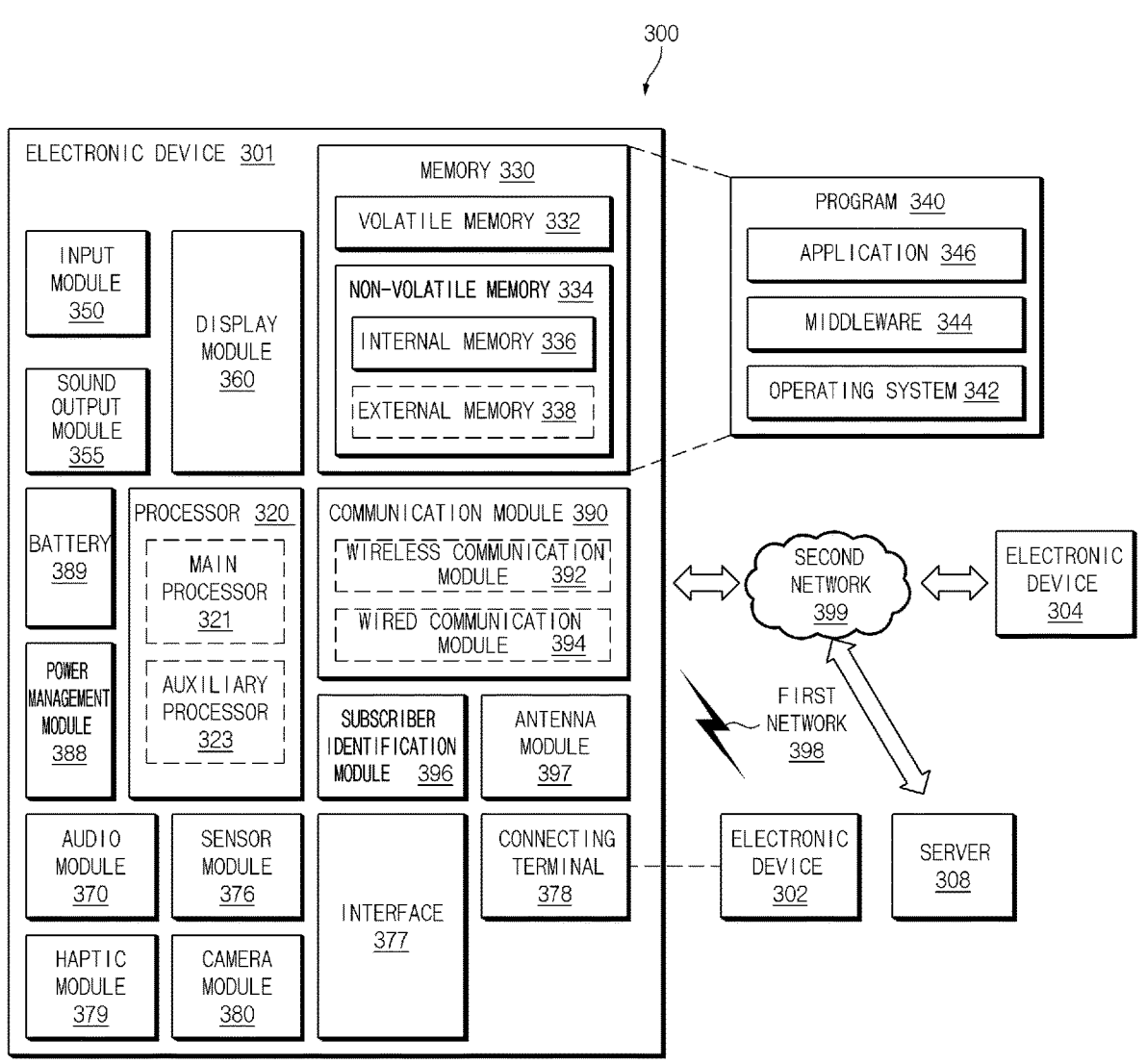
FIG. 17 is a block diagram of an electronic device in a network environment according to an embodiment of the disclosure.

FIG. 17 is a block diagram of an electronic device in a network environment according to an embodiment of the disclosure.

Referring to FIG. 17, the electronic device 301 (e.g., the electronic device 100 of FIGS. 1 and 2) in the network environment 300 may communicate with an external electronic device 302 via a first network 398 (e.g., a short-range wireless communication network), or at least one of an external electronic device 304 or a server 308 via a second network 399 (e.g., a long-range wireless communication network). According to an embodiment of the disclosure, the electronic device 301 may communicate with the external electronic device 304 via the server 308. According to an embodiment of the disclosure, the electronic device 301 may include a processor 320, a memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In some embodiments of the disclosure, at least one of the components (e.g., the connecting terminal 378) may be omitted from the electronic device 301, or one or more other components may be added in the electronic device 301. In some embodiments of the disclosure, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to one embodiment of the disclosure, as at least part of the data processing or computation, the processor 320 may store a command or data received from another component (e.g., the sensor module 376 or the communication module 390) in a volatile memory 332, process the command or the data stored in the volatile memory 332, and store resulting data in a non-volatile memory 334. According to an embodiment of the disclosure, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., a sleep) state, or together with the main processor 321 while the main processor 321 is in an active state (e.g., executing an application). According to an embodiment of the disclosure, the auxiliary processor 323 (e.g., an image signal processor or a communication processor) may be implemented as part of another component (e.g., the camera module 380 or the communication module 390) functionally related to the auxiliary processor 323. According to an embodiment of the disclosure, the auxiliary processor 323 (e.g., the neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment of the disclosure, the display module 360 may include a touch sensor adapted to detect a touch, or a pressure sensor adapted to measure the intensity of force incurred by the touch.

The audio module 370 may convert a sound into an electrical signal and vice versa. According to an embodiment of the disclosure, the audio module 370 may obtain the sound via the input module 350, or output the sound via the sound output module 355 or a headphone of an external electronic device (e.g., the external electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment of the disclosure, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the external electronic device 302) directly (e.g., wiredly) or wirelessly. According to an embodiment of the disclosure, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the external electronic device 302). According to an embodiment of the disclosure, the connecting terminal 378 may include, for example, a HDMI connector, a USB connector, an SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 379 may include, for example, a motor, a piezoelectric element, or an electric stimulator.

The camera module 380 may capture a still image or moving images. According to an embodiment of the disclosure, the camera module 380 may include one or more lenses, image sensors, image signal processors, or flashes.

The power management module 388 may manage power supplied to the electronic device 301. According to one embodiment of the disclosure, the power management module 388 may be implemented as at least part of, for example, a power management integrated circuit (PMIC).

The battery 389 may supply power to at least one component of the electronic device 301. According to an embodiment of the disclosure, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the external electronic device 302, the external electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment of the disclosure, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or infrared data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the external electronic device 304), or a network system (e.g., the second network 399). According to an embodiment of the disclosure, the wireless communication module 392 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment of the disclosure, the antenna module 397 may include an antenna including a radiating element including a conductive material or a conductive pattern formed in or on a substrate (e.g., a printed circuit board (PCB)). According to an embodiment of the disclosure, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment of the disclosure, another component (e.g., a radio frequency integrated circuit (RFIC)) other than the radiating element may be additionally formed as part of the antenna module 397.

According to various embodiments of the disclosure, the antenna module 397 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 301 and the external electronic device 304 via the server 308 coupled with the second network 399. Each of the external electronic devices 302 or 304 may be a device of a same type as, or a different type, from the electronic device 301. According to an embodiment of the disclosure, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In another embodiment of the disclosure, the external electronic device 304 may include an internet-of-things (IoT) device. The server 308 may be an intelligent server using machine learning and/or a neural network. According to an embodiment of the disclosure, the external electronic device 304 or the server 308 may be included in the second network 399. The electronic device 301 may be applied to intelligent services (e.g., smart home, smart city, smart car, or healthcare) based on 5G communication technology or IoT-related technology.

Figure 18:
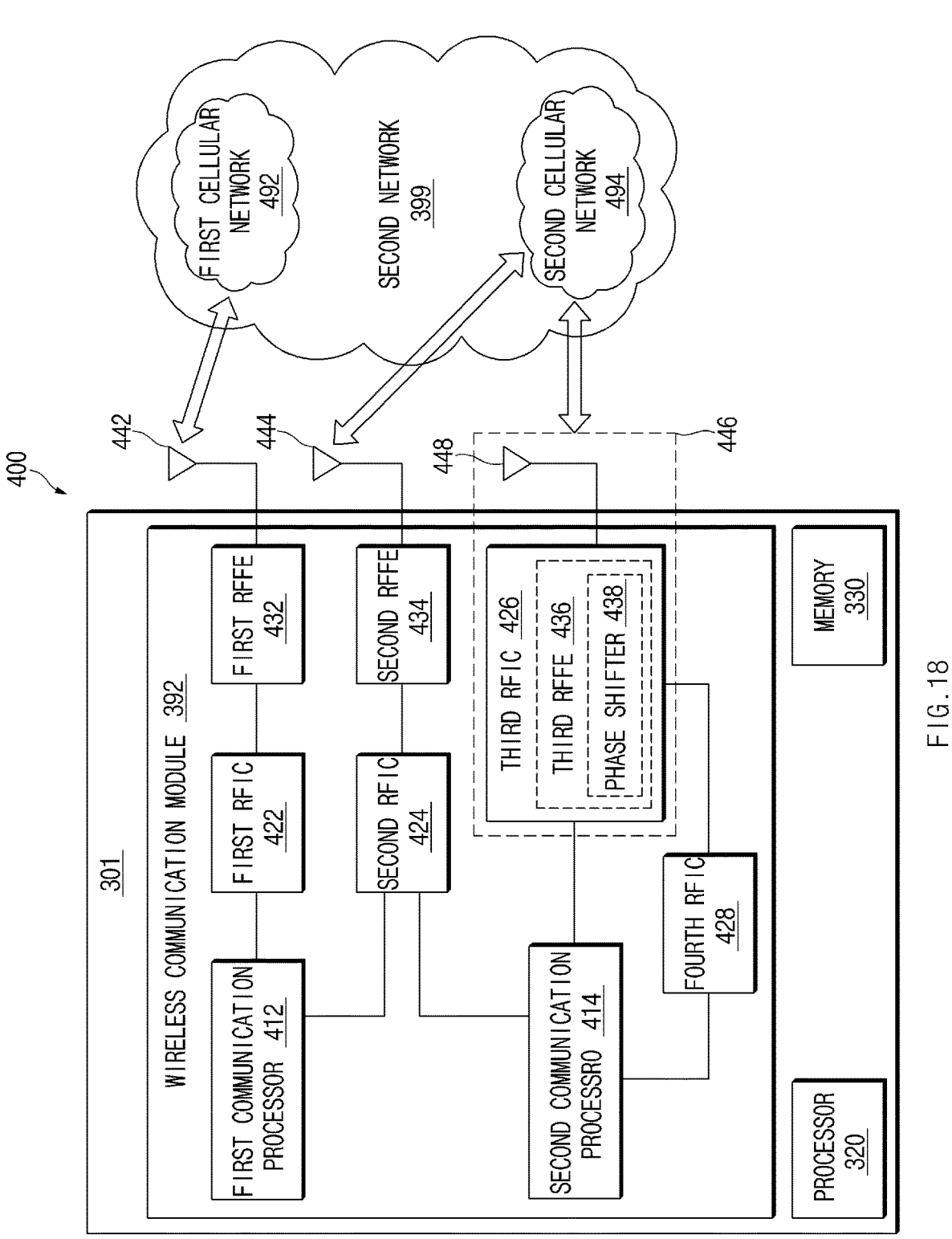
FIG. 18 is a block diagram of an electronic device for supporting legacy network communication and 5G network communication according to an embodiment of the disclosure.

FIG. 18 is a block diagram 400 of an electronic device for supporting legacy network communication and 5G network communication according to an embodiment of the disclosure.

Referring to FIG. 18, the electronic device 301 (e.g., the electronic device 100 of FIGS. 1 and 2) may include a first communication processor 412, a second communication processor 414, a first radio frequency integrated circuit (RFIC) 422, a second RFIC 424, a third RFIC 426, a fourth RFIC 428, a first radio frequency front end (RFFE) 432, a second RFFE 434, a first antenna module 442, a second antenna module 444, and an antenna 448. The electronic device 301 may further include the processor 320 and the memory 330. The second network 399 may include a first cellular network 492 and a second cellular network 494. According to another embodiment of the disclosure, the electronic device 301 may further include at least one of the components illustrated in FIG. 3, and the second network 399 may further include at least one other network. According to an embodiment of the disclosure, the first communication processor 412, the second communication processor 414, the first RFIC 422, the second RFIC 424, the fourth RFIC 428, the first RFFE 432, and the second RFFE 434 may form at least part of the wireless communication module 392. According to another embodiment of the disclosure, the fourth RFIC 428 may be omitted or may be included as a part of the third RFIC 426.

The first communication processor 412 may establish a communication channel of a band to be used for wireless communication with the first cellular network 492 and may support legacy network communication over the established communication channel. According to various embodiments of the disclosure, the first cellular network 492 may be a legacy network including $2^{nd}$ generation (2G), $3^{rd}$ generation (3G), 4G, and/or long term evolution (LTE) network. The second communication processor 414 may establish a communication channel corresponding to a specified band (e.g., about 6 GHz to about 60 GHz) of bands to be used for wireless communication with the second network 494 and may support the 5G network communication over the established communication channel. According to various embodiments of the disclosure, the second cellular network 494 may be a 5G network defined in the $3^{rd}$ generation partnership project (3GPP). Additionally, according to an embodiment of the disclosure, the first communication processor 412 or the second communication processor 414 may establish a communication channel corresponding to another specified band (e.g., about 6 GHz or lower) of the bands to be used for wireless communication with the second network 494 and may support the 5G network communication over the established communication channel. According to an embodiment of the disclosure, the first communication processor 412 and the second communication processor 414 may be implemented within a single chip or a single package. According to various embodiments of the disclosure, the first communication processor 412 or the second communication processor 414 may be implemented in a single chip or a single package together with the processor 320, the auxiliary processor 323 of FIG. 1, or the communication module 390.

In the case of transmitting a signal, the first RFIC 422 may convert a baseband signal generated by the first communication processor 412 into a radio frequency (RF) signal of about 700 megahertz (MHz) to about 3 GHz that is used in the first cellular network 492 (e.g., a legacy network). In the case of receiving a signal, an RF signal may be obtained from the first cellular network 492 (e.g., a legacy network) through an antenna (e.g., the first antenna module 442) and may be pre-processed through an RFFE (e.g., the first RFFE 432). The first RFIC 422 may convert the pre-processed RF signal into a baseband signal such that the pre-processed RF signal is able to be processed by the first communication processor 412.

In the case of transmitting a signal, the second RFIC 424 may convert a baseband signal generated by the first communication processor 412 or the second communication processor 414 into an RF signal (hereinafter, referred to as a "5G Sub6 RF signal") in a Sub6 band (e.g., about 6 GHz or lower) used in the second cellular network 494 (e.g., a 5G network). In the case of receiving a signal, a 5G Sub6 RF signal may be obtained from the second cellular network 494 (e.g., a 5G network) through an antenna (e.g., the second antenna module 444) and may be pre-processed through an RFFE (e.g., the second RFFE 434). The second RFIC 424 may convert the pre-processed 5G Sub6 RF signal into a baseband signal such that the pre-processed 5G Sub6 RF signal is able to be processed by a corresponding one of the first communication processor 412 or the second communication processor 414.

The third RFIC 426 may convert a baseband signal generated by the second communication processor 414 into an RF signal (hereinafter, referred to as a "5G Above6 RF signal") in a 5G Above6 band (e.g., about 6 GHz to about 60 GHz) to be used in the second cellular network 494 (e.g., a 5G network). In the case of receiving a signal, a 5G Above6 RF signal may be obtained from the second cellular network 494 (e.g., a 5G network) through an antenna (e.g., the antenna 448) and may be pre-processed through a third RFFE 436. For example, the third RFFE 436 may perform pre-processing on a signal by using a phase shifter 438. The third RFIC 426 may convert the pre-processed 5G Above 6 RF signal into a baseband signal such that the pre-processed 5G Above 6 RF signal is able to be processed by the second communication processor 414. According to an embodiment of the disclosure, the third RFFE 436 may be implemented as a part of the third RFIC 426.

According to an embodiment of the disclosure, the electronic device 301 may include the fourth RFIC 428 independently of the third RFIC 426 or as at least part of the third RFIC 426. In this case, the fourth RFIC 428 may convert a baseband signal generated by the second communication processor 414 into an RF signal (hereinafter, referred to as an "IF signal") in an intermediate frequency band (e.g., about 9 GHz to about 11 GHz) and may transfer the IF signal to the third RFIC 426. The third RFIC 426 may convert the IF signal into a 5G Above6 RF signal. In the case of receiving a signal, a 5G Above6 RF signal may be received from the second cellular network 494 (e.g., a 5G network) through an antenna (e.g., the third antenna 448) and may be converted into an IF signal by the third RFIC 426. The fourth RFIC 428 may convert the IF signal into a baseband signal such that the IF signal is able to be processed by the second communication processor 414.

According to an embodiment of the disclosure, the first RFIC 422 and the second RFIC 424 may be implemented with at least a part of a single package or a single chip. According to an embodiment of the disclosure, the first RFFE 432 and the second RFFE 434 may be implemented with at least a part of a single package or a single chip. According to an embodiment of the disclosure, at least one of the first antenna module 442 or the second antenna module 444 may be omitted or may be combined with any other antenna module to process RF signals in a plurality of bands.

According to an embodiment of the disclosure, the third RFIC 426 and the antenna 448 may be disposed at the same substrate to form a third antenna module 446. For example, the wireless communication module 392 or the processor 320 may be disposed at a first substrate (e.g., a main PCB). In this case, the third RFIC 426 may be disposed in a partial region (e.g., on a lower surface) of a second substrate (e.g., a sub PCB) independent of the first substrate, and the antenna 448 may be disposed in another partial region (e.g., on an upper surface) of the second substrate. As such, the third antenna module 446 may be formed. According to an embodiment of the disclosure, the antenna 448 may include, for example, an antenna array capable of being used for beamforming. As the third RFIC 426 and the antenna 448 are disposed at the same substrate, it may be possible to decrease a length of a transmission line between the third RFIC 426 and the antenna 448. For example, the decrease in the length of the transmission line may make it possible to prevent a signal in a high frequency band (e.g., about 6 GHz to about 60 GHz) used for the 5G network communication from being lost (or attenuated) due to the transmission line. As such, the electronic device 301 may improve the quality or speed of communication with the second cellular network 494 (e.g., a 5G network).

The second cellular network 494 (e.g., a 5G network) may be used independently of the first cellular network 492 (e.g., a legacy network) (e.g., this scheme being called "stand-alone (SA)") or may be used in connection with the first cellular network 492 (e.g., this scheme being called "non-stand alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 301 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., New Radio (NR) protocol information) for communication with the 5G network may be stored in the memory 330 so as to be accessed by any other component (e.g., the processor 320, the first communication processor 412, or the second communication processor 414).

Due to an arrangement of a hinge structure, a foldable electronic device may have a limitation in the mounting position of a high-frequency antenna module, and it may be difficult to secure a sufficient separation distance from a housing structure made of a metallic material. When the antenna module and the metal housing structure are located close to each other, interference between the metal housing structure and the antenna module may occur, and the performance of an antenna may be degraded.

Embodiments of the disclosure described herein relate to a mounting structure of an antenna module for securing the performance of a high-frequency antenna module in a foldable electronic device.

The technical problems to be solved by the disclosure are not limited to the aforementioned problems, and any other technical problems not mentioned herein will be clearly understood from the following description by those skilled in the art to which the disclosure pertains.

An electronic device 100 according to an embodiment of the disclosure may include a first housing 110 including a first plate 111, a second housing 120 including a second plate 121, a display 130 disposed on the first plate 111 of the first housing 110 and the second plate 121 of the second housing 120, a hinge member 150 that is disposed between the first housing 110 and the second housing 120 and that rotatably connects the first housing 110 and the second housing 120, and an antenna module disposed in the first housing 110. The first plate 111 may include an antenna seating portion 114 on which the antenna module 200 is seated. The antenna seating portion 114 may be formed between a first sidewall part 115 and a second sidewall part 116 that vertically extend from one surface 111b of the first plate 111 and face each other. The antenna module 200 may be disposed such that at least a portion faces the first sidewall part 115 and the second sidewall part 116. The first sidewall part 115 may include a bumpy structure 115a and 115b.

In an embodiment of the disclosure, the bumpy structure 115a and 115b of the first sidewall part 115 may include a plurality of protrusions 115a spaced apart from each other.

In an embodiment of the disclosure, the electronic device 100 may further include a first circuit board 161 disposed in the first housing 110 and a second circuit board 162 disposed in the second housing 120, and a connecting member 170 that electrically connects the first circuit board 161 and the second circuit board 162. The connecting member 170 may extend over the first housing 110, the hinge member 150, and the second housing 120.

In an embodiment of the disclosure, a first edge 111p of the first plate 111 and a second edge 121p of the second plate 121 may be in contact with each other in an unfolded state of the electronic device 100. The antenna seating portion 114 may be located between the first circuit board 161 and the first edge 111p of the first plate 111. The unfolded state may be defined as a state in which the first housing 110 and the second housing 120 are located on substantially the same line.

In an embodiment of the disclosure, the first plate 111 may include a first through-hole h1 that penetrates the first plate 111, and the connecting member 170 may pass through the first through-hole h1. The second plate 121 may include a second through-hole h2 that penetrates the second plate, and the connecting member 170 may pass through the second through-hole h2. The first through-hole h1 may be located between the antenna seating portion 114 and the first circuit board 161.

In an embodiment of the disclosure, a third sidewall part 117 that extends from the first sidewall part 115 may be formed on the first plate 111. The first sidewall part 115 and the third sidewall part 117 may be configured to surround a region around the first through-hole h1.

In an embodiment of the disclosure, the first sidewall part 115 and the third sidewall part 117 may form a predetermined space in which a waterproof member 192 is disposed. The waterproof member 192 may overlap the first through-hole h1, or may be at least partially accommodated in the first through-hole h1.

In an embodiment of the disclosure, the first sidewall part 115 may be located between at least a portion of the antenna module 200 and the first through-hole h1.

In an embodiment of the disclosure, the first plate 111 may include a first surface 111a on which the display 130 is disposed and a second surface 111b that faces away from the first surface 111a, and the second plate 121 may include a third surface 121a on which the display 130 is disposed and a fourth surface 121b that faces away from the third surface 121a. The antenna seating portion 114 may be formed on a partial region of the second surface 111b of the first plate 111. The first sidewall part 115 and the second sidewall part 116 may extend to a predetermined height from the second surface 111b.

In an embodiment of the disclosure, the first circuit board 161 may be disposed on the second surface 111b of the first plate 111. The second circuit board 162 may be disposed on the fourth surface 121b of the second plate 121. The connecting member 170 may extend from the second surface 111b to the fourth surface 121b across the first surface 111a, the hinge member 150, and the third surface 121a.

In an embodiment of the disclosure, the hinge member 150 may include a plurality of hinge structures 151 to which the first plate 111 and the second plate 121 are connected so as to be rotatable and a hinge cover 155 that is coupled with the plurality of hinge structures 151 and that includes an inner space 156 in which the plurality of hinge structures 151 are partially accommodated.

In an embodiment of the disclosure, the second sidewall part 116 may include a step portion 116a, a first portion 116c that extends from the step portion 116a toward the display 130, and a second portion 116b that extends from the step portion 116a in a direction opposite to the first portion 116c. A distance between the second portion 116b and the antenna module 200 may be greater than a distance between the first portion 116c and the antenna module 200.

In an embodiment of the disclosure, the electronic device 100 may further include a rear case 194 disposed on the one surface 111b of the first plate 111 to cover a portion of the first circuit board 161 and the antenna module 200. The rear case 194 may make contact with the protrusions 115a of the first sidewall part 115.

In an embodiment of the disclosure, the rear case 194 may include a moldable material.

In an embodiment of the disclosure, the connecting member 170 may include a wiring member 173, a first connector 174 disposed on one end portion of the wiring member 173 and electrically coupled to the first circuit board 161, and a second connector 175 disposed on an opposite end portion of the wiring member 173 and electrically coupled to the second circuit board 162. A portion of the rear case 194 may overlap the first connector 174.

In an embodiment of the disclosure, the antenna module 200 may include a base substrate 210 disposed on the antenna seating portion 114 and a plurality of antenna elements 261, 262, 263, 264, and 265 disposed on one surface 211 of the base substrate 210. A plurality of recesses 115b may be defined on opposite sides of the plurality of protrusions 115a in a direction of a width w. The recesses 115b may be aligned with at least some of the plurality of antenna elements 261, 262, 263, 264, and 265 in a first direction ①) when the one surface 211 of the base substrate 210 is viewed from above.

In an embodiment of the disclosure, the plurality of antenna elements 261, 262, 263, 264, and 265 may be spaced apart from each other by a specified gap. The first direction ① may be parallel to the base substrate 210 and perpendicular to a direction in which the plurality of antenna elements 261, 262, 263, 264, and 265 are arranged. The bumpy structure 115a and 115b may be configured such that the protrusions 115a do not overlap the plurality of antenna elements 261, 262, 263, 264, and 265 based on the first direction ①.

In an embodiment of the disclosure, the width w of the protrusions 115*a* may be a distance corresponding to a direction parallel to the direction in which the plurality of antenna elements 261, 262, 263, 264, and 265 are arranged. The width w of the protrusions 115*a* may be substantially the same as a gap between the plurality of antenna elements 261, 262, 263, 264, and 265.

In an embodiment of the disclosure, a plurality of VIAs may be formed in the base substrate 210. The base substrate 210 may include a plurality of antenna element VIA regions including VIAs that overlap the plurality of antenna elements 261, 262, 263, 264, and 265 among the plurality of VIAs and a ground VIA region 213 formed between the plurality of antenna element VIA regions. The protrusions 115*a* may overlap the ground VIA region 213 based on the first direction ①.

In an embodiment of the disclosure, the width w of the protrusions 115*a* may be substantially the same as a width of the ground VIA region 213.

According to the embodiments of the disclosure, the bumpy structure may be formed on the metal housing structures facing the antenna module. Accordingly, the area by which the antenna module and the housing structures overlap each other may be reduced, and the performance of the antenna module may be secured and/or improved.

An electronic device according to an embodiment of the disclosure may include a first housing having a first circuit board disposed therein, a second housing having a second circuit board disposed therein, a connecting member that connects the first circuit board and the second circuit board, a display at least partially disposed on the first housing and the second housing, a hinge member that is disposed between the first housing and the second housing and that rotatably connects the first housing and the second housing, and an antenna module disposed in the first housing. The first housing may include an antenna seating portion on which the antenna module is seated. The antenna seating portion may be formed between a first sidewall part and a second sidewall part spaced apart from each other. At least a portion of the antenna module may overlap the connecting member when viewed in a first direction toward the display.

In an embodiment, the first housing may include a first through-hole through which a portion of the connecting member is disposed, and the second housing may include a second through-hole through which a portion of the connecting member is disposed.

In an embodiment, the first housing may include a first side part on which one side of the hinge member is seated, a second side part and a third side part disposed on opposite sides of the first side part, and a fourth side part spaced apart from the first side part. The first through-hole may be disposed adjacent to the first side part while penetrating an upper surface and a lower surface of the first housing. The second housing may include a fifth side part on which an opposite side of the hinge member is seated, the fifth side part being disposed adjacent to the first side part when the electronic device is in an unfolded state, a sixth side part and a seventh side part disposed on opposite sides of the fifth side part, and an eighth side part spaced apart from the fifth side part.

In an embodiment, the second through-hole may be disposed adjacent to the fifth side part while penetrating an upper surface and a lower surface of the second housing.

In an embodiment, the first sidewall part may include a plurality of protrusions (or, at least one protrusion) having a greater height in a second direction toward the display than surroundings and at least one recess (or, a plurality of recesses) having a smaller height in the second direction than the plurality of protrusions (or, the at least one protrusion).

In an embodiment, the plurality of protrusions may be disposed to at least partially overlap gaps between a plurality of radiating members disposed in the antenna module when viewed in a direction perpendicular to the first direction toward the display and parallel to a surface of the display.

In an embodiment, the at least one recess may be disposed to at least partially overlap each radiating member of the antenna module when viewed in a direction perpendicular to the first direction toward the display and parallel to a surface of the display.

In an embodiment, the plurality of protrusions may be formed to be inclined in a direction from the first side part to the first through-hole.

In an embodiment, the connecting member may be disposed over the first housing, the hinge member, and the second housing.

In an embodiment, the first housing may include a third sidewall part that extends from the first sidewall part, and the first sidewall part and the third sidewall part may surround a region around the first through-hole.

In an embodiment, the antenna module may include a base substrate disposed on the antenna seating portion and a plurality of antenna elements disposed on one surface of the base substrate, and the at least one recess may be aligned with at least a part of the plurality of antenna elements when the one surface of the base substrate is viewed from above.

In an embodiment, the plurality of antenna elements may be spaced apart from each other by a specified gap, and at least some of the plurality of protrusions may not overlap the plurality of antenna elements based on a third direction parallel to a surface of the display.

In an embodiment, widths of the plurality of protrusions may correspond to separation distances between the plurality of antenna elements.

In an embodiment, a plurality of VIAs may be formed in the base substrate. The base substrate may include a plurality of antenna element VIA regions including VIAs that overlap the plurality of antenna elements among the plurality of VIAs and a ground VIA region formed between the plurality of antenna element VIA regions. The plurality of protrusions may overlap the ground VIA region based on a direction parallel to the surface of the display.

Meanwhile, in the above description, the structure in which the antenna module is disposed adjacent to the first side part of the first housing has been exemplified, but the disclosure is not limited thereto. For example, a plurality of antenna modules may be provided, and a specific antenna module may be disposed adjacent to the fifth side part of the second housing. In this case, as described above, at least portions of the specific antenna module and the connecting member may overlap each other (or, may be aligned with each other) in the up/down direction (e.g., the direction toward the display).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 340) including one or more instructions that are stored in a storage medium (e.g., an internal memory 336 or an external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing having a first circuit board disposed therein;

a second housing having a second circuit board disposed therein;

a connecting member configured to connect the first circuit board and the second circuit board;

a display at least partially disposed on the first housing and the second housing;

a hinge member disposed between the first housing and the second housing and configured to rotatably connect the first housing and the second housing; and an antenna module disposed in the first housing, wherein the first housing includes an antenna seating portion on which the antenna module is seated, wherein the antenna seating portion is formed between a first sidewall part and a second sidewall part spaced apart from each other, wherein the first sidewall part includes a plurality of protrusions and at least one recess having a smaller height than the plurality of protrusions, and wherein at least a portion of the connecting member is disposed between the antenna module and the display so as to at least partially overlap the antenna module in a direction from the display towards the antenna module.

2. The electronic device of claim 1, wherein the first housing includes a first through-hole through which a portion of the connecting member is disposed, and wherein the second housing includes a second through-hole through which a portion of the connecting member is disposed.

3. The electronic device of claim 2, wherein the first housing includes a first side part on which one side of the hinge member is seated, a second side part and a third side part disposed on opposite sides of the first side part, and a fourth side part spaced apart from the first side part, wherein the first through-hole is disposed adjacent to the first side part while penetrating an upper surface and a lower surface of the first housing, wherein the second housing includes a fifth side part on which an opposite side of the hinge member is seated, the fifth side part being disposed adjacent to the first side part when the electronic device is in an unfolded state, a sixth side part and a seventh side part disposed on opposite sides of the fifth side part, and an eighth side part spaced apart from the fifth side part, and wherein the second through-hole is disposed adjacent to the fifth side part while penetrating an upper surface and a lower surface of the second housing.

4. The electronic device of claim 1, wherein the plurality of protrusions are disposed to at least partially overlap gaps between a plurality of radiating members disposed in the antenna module when viewed in a direction perpendicular to the direction from the display towards the antenna module and parallel to a surface of the display.

5. The electronic device of claim 1, wherein the at least one recess is disposed to at least partially overlap each radiating member of the antenna module when viewed in a direction perpendicular to the direction from the display towards the antenna module and parallel to a surface of the display.

6. The electronic device of claim 1, wherein the plurality of protrusions are formed to be inclined in a direction from a first side part to a first through-hole of the first housing through which a portion of the connecting member is disposed.

7. The electronic device of claim 1, wherein the connecting member is disposed over the first housing, the hinge member, and the second housing.

8. The electronic device of claim 2, wherein the first housing includes a third sidewall part configured to extend from the first sidewall part, and wherein the first sidewall part and the third sidewall part are configured to surround a region around the first through-hole.

9. The electronic device of claim 8, wherein the first sidewall part and the third sidewall part form a space in which a waterproof member is disposed, and wherein the waterproof member overlaps the first through-hole or is at least partially accommodated in the first through-hole.

10. The electronic device of claim 1, wherein the hinge member includes:

a plurality of hinge structures to which the first housing and the second housing are connected so as to be rotatable; and a hinge cover coupled with the plurality of hinge structures, the hinge cover including an inner space in which the plurality of hinge structures are partially accommodated.

11. The electronic device of claim 1, wherein the second sidewall part includes a step portion, a first portion configured to extend from the step portion toward the display, and a second portion configured to extend from the step portion in an opposite direction to the first portion, and wherein a distance between the second portion and the antenna module is greater than a distance between the first portion and the antenna module.

12. The electronic device of claim 1, further comprising:

a rear case disposed to cover a portion of the first circuit board and the antenna module, wherein the rear case makes contact with a protrusion of the first sidewall part.

13. The electronic device of claim 12, wherein the rear case includes a moldable material.

14. The electronic device of claim 12, wherein the connecting member includes a wiring member, a first connector disposed on one end portion of the wiring member and electrically coupled to the first circuit board, and a second connector disposed on an opposite end portion of the wiring member and electrically coupled to the second circuit board, and wherein a portion of the rear case overlaps the first connector.

15. The electronic device of claim 1, wherein the antenna module includes a base substrate disposed on the antenna seating portion and a plurality of antenna elements disposed on one surface of the base substrate, and wherein the at least one recess is aligned with at least a part of the plurality of antenna elements when the one surface of the base substrate is viewed from above.

16. The electronic device of claim 15, wherein the plurality of antenna elements are spaced apart from each other by a specified gap, and wherein at least some of the plurality of protrusions do not overlap the plurality of antenna elements based on a third direction parallel to a surface of the display.

17. The electronic device of claim 16, wherein widths of the plurality of protrusions correspond to separation distances between the plurality of antenna elements.

18. The electronic device of claim 16, wherein a plurality of VIAs are formed in the base substrate, wherein the base substrate includes a plurality of antenna element VIA regions including VIAs configured to overlap the plurality of antenna elements among the plurality of VIAs and a ground VIA region formed between the plurality of antenna element VIA regions, and wherein the plurality of protrusions overlap the ground VIA region based on a direction parallel to the surface of the display.

19. The electronic device of claim 18, wherein the plurality of protrusions have a width same as, or similar to, a width of the ground VIA region.

* * * * *